US008795536B2

(12) United States Patent
Gilbeau et al.

(10) Patent No.: US 8,795,536 B2
(45) Date of Patent: Aug. 5, 2014

(54) PROCESS FOR DEGRADING ORGANIC SUBSTANCES IN AN AQUEOUS COMPOSITION

(75) Inventors: Patrick Gilbeau, Braine-le-Comte (BE); Ward Blancke, Tavaux (FR)

(73) Assignee: Solvay (Societe Anonyme), Brussels (BE)

( * ) Notice: Subject to any disclaimer, the term of this patent is extended or adjusted under 35 U.S.C. 154(b) by 884 days.

(21) Appl. No.: 12/864,211

(22) PCT Filed: Jan. 29, 2009

(86) PCT No.: PCT/EP2009/050982
§ 371 (c)(1),
(2), (4) Date: Jul. 27, 2010

(87) PCT Pub. No.: WO2009/095429
PCT Pub. Date: Aug. 6, 2009

(65) Prior Publication Data
US 2010/0294727 A1    Nov. 25, 2010

(30) Foreign Application Priority Data

Jan. 31, 2008 (EP) .................................... 08150925
Dec. 12, 2008 (EP) .................................... 08171544

(51) Int. Cl.
C02F 1/32       (2006.01)
C02F 1/76       (2006.01)
C02F 1/48       (2006.01)
C01D 3/14       (2006.01)
C02F 1/72       (2006.01)
C02F 101/30     (2006.01)
C02F 101/10     (2006.01)
C02F 103/36     (2006.01)
C02F 1/30       (2006.01)
C02F 1/22       (2006.01)
C02F 1/04       (2006.01)

(52) U.S. Cl.
CPC ............ *C02F 1/722* (2013.01); *C02F 2101/30* (2013.01); *C02F 1/76* (2013.01); *C02F 2209/06* (2013.01); *C02F 2101/10* (2013.01); *C02F 2103/36* (2013.01); *C02F 1/30* (2013.01); *C01D 3/14* (2013.01); *C02F 1/32* (2013.01); *C02F 2201/46115* (2013.01); *C02F 1/22* (2013.01); *C02F 1/048* (2013.01); *C02F 2209/02* (2013.01); *C02F 2209/03* (2013.01)
USPC ................ 210/748.13; 210/748.16; 210/756; 210/721; 210/724; 210/752; 423/488; 423/88; 423/15; 423/204; 423/210; 205/688; 205/698; 205/742; 422/5; 422/129; 422/243

(58) Field of Classification Search
USPC .............. 210/748.01, 748.04, 748.1, 748.12, 210/748.13, 748.16, 748.17, 748.19, 756, 210/721, 723, 724, 725, 727, 728, 729, 743, 210/746, 747.8, 758, 109, 243, 263, 450, 210/554, 600, 660, 662, 666, 671, 269, 270, 210/272, 228.2, 230.2, 242, 225; 205/687, 205/742, 743, 751, 755, 688, 698, 761; 423/488, 155, 204, 206 R, 437, 210, 423/168, 224, 235, 236, 240 R, 243.03, 423/245.1; 422/5, 129, 243, 292; 204/263, 204/283, 284, 290 F, 290 R, 291, 292, 294
See application file for complete search history.

(56) References Cited

U.S. PATENT DOCUMENTS

| | | | |
|---|---|---|---|
| 280,893 A | 7/1883 | Baujard |
| 865,727 A | 9/1907 | Queneau |
| 2,060,715 A | 11/1936 | Arvin |
| 2,063,891 A | 12/1936 | Dreyfus |
| 2,144,612 A | 1/1939 | Britton et al. |
| 2,198,600 A | 4/1940 | Britton et al. |
| 2,248,635 A | 7/1941 | Marple et al. |
| 2,319,876 A | 5/1943 | Moss |
| 2,444,333 A | 6/1948 | Castan |
| 2,463,850 A | 3/1949 | Brooks |
| 2,726,072 A | 12/1955 | Herman |
| 2,733,195 A | 1/1956 | Miller |
| 2,811,227 A | 10/1957 | O'Connor |
| 2,829,124 A | 4/1958 | Napravnik et al. |
| 2,860,146 A | 11/1958 | Furman et al. |
| 2,876,217 A | 3/1959 | Paschall |

(Continued)

FOREIGN PATENT DOCUMENTS

BE        422877 A       8/1937
CA       2 375 245      12/2000

(Continued)

OTHER PUBLICATIONS

[Unknown Author], Kirk Othmer Encyclopedia of Chemical Technology—vol. 2, p. 156, John Wiley and Sons, 1992.
Ma Zengxin et al, "recovery of Polyglycerol from residues of Synthetic Glycerol" Riyong Huaxue Gongye, 1997, 4, 21023 (English Abstract only).
Sang Hee Lee et al "Direct preparation of Dichloropropanol (DCP) from Glycerol Using Heteropolyacid (HPA) Catalysts: A Catalyst Screen Study," Catalysis Communications (9), 2008, p. 1920-1923.
Production and Prospect of the World Natural Glycerol by Zhu Shiyong, Cereals and Oils, vol. 1, 1997, pp. 33-38 (No English Translation).
Vinnolit; Vinnolit receives EU grant for water recycling project: Press Release 2008. http://www.vinnolit.de/vinnolit.nsf/id/EN__Vinnolit_receives_EU_grant_for_water_recycling_project_.
N.W. Ziels, Journal of American Oil Chemists'Society, Nov. 1956, vol. 33, pp. 556-565.

(Continued)

*Primary Examiner* — Walter D Griffin
*Assistant Examiner* — Cameron J Allen
(74) *Attorney, Agent, or Firm* — Oblon, Spivak, McClelland, Maier & Neustadt, L.L.P.

(57) ABSTRACT

Process for degrading organic substances in an aqueous composition comprising a step (a) wherein, in a liquid reaction medium, said aqueous composition is reacted with at least one composition comprising hydroxide ions (OH$^-$) and hypochlorite in a molar ratio between hydroxide and hypochlorite higher than or equal to 0.001 and lower than 1.5, in order to oxidize said organic substances.

20 Claims, No Drawings

(56) References Cited

U.S. PATENT DOCUMENTS

| | | | |
|---|---|---|---|
| 2,505,735 A | 4/1960 | Halbedel |
| 2,945,004 A | 7/1960 | Greenlee |
| 2,960,447 A | 11/1960 | Anderson et al. |
| 3,026,270 A | 3/1962 | Robinson, Jr. |
| 3,052,612 A | 9/1962 | Henegar et al. |
| 3,061,615 A | 10/1962 | Viriot et al. |
| 3,121,727 A | 2/1964 | Baliker et al. |
| 3,135,705 A | 6/1964 | Vandenberg |
| 3,158,580 A | 11/1964 | Vandenberg |
| 3,158,581 A | 11/1964 | Vandenberg |
| 3,247,227 A | 4/1966 | White |
| 3,260,059 A | 7/1966 | Rosenberg et al. |
| 3,341,491 A | 9/1967 | Robinson et al. |
| 3,355,511 A | 11/1967 | Schwarzer |
| 3,385,908 A | 5/1968 | Schwarzer |
| 3,445,197 A | 5/1969 | Resh et al. |
| 3,457,282 A | 7/1969 | Polak et al. |
| 3,618,295 A | 11/1971 | Geiger et al. |
| 3,711,388 A | 1/1973 | Gritzner |
| 3,766,221 A | 10/1973 | Becker |
| 3,839,169 A | 10/1974 | Moyer |
| 3,865,886 A | 2/1975 | Schindler et al. |
| 3,867,166 A | 2/1975 | Sullivan |
| 3,879,180 A | 4/1975 | Hutgens et al. |
| 3,954,581 A | 5/1976 | Carlin |
| 3,968,178 A | 7/1976 | Obrecht et al. |
| 4,003,723 A | 1/1977 | Schafer et al. |
| 4,011,251 A | 3/1977 | Tjurin et al. |
| 4,024,301 A | 5/1977 | Witenhafer et al. |
| 4,104,434 A | 8/1978 | Johnson |
| 4,127,594 A | 11/1978 | Anderson et al. |
| 4,173,710 A | 11/1979 | Boulet et al. |
| 4,197,399 A | 4/1980 | Noel et al. |
| 4,220,529 A * | 9/1980 | Daude-Lagrave | 210/758 |
| 4,240,885 A | 12/1980 | Suciu et al. |
| 4,255,470 A | 3/1981 | Cohen et al. |
| 4,294,776 A | 10/1981 | Hardy et al. |
| 4,309,394 A | 1/1982 | Hudson |
| 4,322,367 A | 3/1982 | Silvis |
| 4,390,680 A | 6/1983 | Nelson |
| 4,405,465 A | 9/1983 | Moore et al. |
| 4,415,460 A | 11/1983 | Suciu et al. |
| 4,464,517 A | 8/1984 | Makino et al. |
| 4,499,255 A | 2/1985 | Wang et al. |
| 4,560,812 A | 12/1985 | Blytas |
| 4,595,469 A | 6/1986 | Foller |
| 4,599,178 A | 7/1986 | Blytas |
| 4,609,751 A | 9/1986 | Hajjar |
| 4,634,784 A | 1/1987 | Nagato et al. |
| 4,655,879 A | 4/1987 | Brockmann et al. |
| 4,877,497 A | 10/1989 | Watanabe et al. |
| 4,898,644 A | 2/1990 | Van Horn |
| 4,935,220 A | 6/1990 | Schneider et al. |
| 4,960,953 A | 10/1990 | Jakobson et al. |
| 4,973,763 A | 11/1990 | Jakobson et al. |
| 4,990,695 A | 2/1991 | Buenemann et al. |
| 5,041,688 A | 8/1991 | Jakobson et al. |
| 5,200,163 A | 4/1993 | Henkelmann et al. |
| 5,278,260 A | 1/1994 | Schaffner et al. |
| 5,286,354 A | 2/1994 | Bard et al. |
| 5,344,945 A | 9/1994 | Grunchard |
| 5,359,094 A | 10/1994 | Teles et al. |
| 5,393,428 A | 2/1995 | Dilla et al. |
| 5,445,741 A | 8/1995 | Dilla et al. |
| 5,478,472 A | 12/1995 | Dilla et al. |
| 5,486,627 A | 1/1996 | Quarderer et al. |
| 5,567,359 A | 10/1996 | Cassidy et al. |
| 5,578,740 A | 11/1996 | Au et al. |
| 5,679,839 A | 10/1997 | Armand et al. |
| 5,710,350 A | 1/1998 | Jeromin et al. |
| 5,731,476 A | 3/1998 | Shawl et al. |
| 5,744,655 A | 4/1998 | Thomas et al. |
| 5,766,270 A | 6/1998 | Neuman et al. |
| 5,779,915 A | 7/1998 | Becker et al. |
| 5,879,522 A * | 3/1999 | Shaaban et al. | 204/263 |
| 5,908,946 A | 6/1999 | Stern et al. |
| 5,955,043 A | 9/1999 | Neuman et al. |
| 5,993,974 A | 11/1999 | Fukushima et al. |
| 6,024,839 A | 2/2000 | Schufeldt |
| 6,103,092 A | 8/2000 | Silva |
| 6,111,153 A | 8/2000 | Crow et al. |
| 6,142,458 A | 11/2000 | Howk |
| 6,177,599 B1 | 1/2001 | Cowfer et al. |
| 6,270,682 B1 | 8/2001 | Santen et al. |
| 6,288,248 B1 | 9/2001 | Strebelle et al. |
| 6,288,287 B2 | 9/2001 | Ueoka et al. |
| 6,350,888 B1 | 2/2002 | Strebelle et al. |
| 6,350,922 B1 | 2/2002 | Vosejpka et al. |
| 6,428,759 B1 | 8/2002 | Smith et al. |
| 6,521,794 B2 | 2/2003 | Hirota |
| 6,589,497 B2 | 7/2003 | Smith |
| 6,719,957 B2 | 4/2004 | Brady, Jr. et al. |
| 6,740,633 B2 | 5/2004 | Norenberg et al. |
| 6,806,396 B2 | 10/2004 | Gelblum et al. |
| 6,831,201 B2 | 12/2004 | Katsuura et al. |
| 7,126,032 B2 | 10/2006 | Aiken |
| 7,128,890 B2 | 10/2006 | Ollivier |
| 7,453,008 B2 | 11/2008 | Ko et al. |
| 7,557,253 B2 | 7/2009 | Gilbeau |
| 7,584,629 B2 | 9/2009 | Sohn et al. |
| 7,615,670 B2 | 11/2009 | Gilbeau |
| 7,619,056 B2 | 11/2009 | East et al. |
| 8,106,246 B2 | 1/2012 | Krafft et al. |
| 2001/0014763 A1 | 8/2001 | Ueoka et al. |
| 2003/0209490 A1 * | 11/2003 | Camp et al. | 210/631 |
| 2004/0016411 A1 | 1/2004 | Joyce et al. |
| 2004/0024244 A1 | 2/2004 | Walsdorff et al. |
| 2004/0047781 A1 | 3/2004 | Becenel, Jr. |
| 2004/0150123 A1 | 8/2004 | Strofer et al. |
| 2004/0179987 A1 | 9/2004 | Oku et al. |
| 2004/0232007 A1 * | 11/2004 | Carson et al. | 205/688 |
| 2005/0115901 A1 | 6/2005 | Heuser et al. |
| 2005/0218082 A1 * | 10/2005 | Williamson et al. | 210/739 |
| 2005/0261509 A1 | 11/2005 | Delfort et al. |
| 2006/0052272 A1 | 3/2006 | Meli et al. |
| 2006/0079433 A1 | 4/2006 | Hecht et al. |
| 2006/0123842 A1 | 6/2006 | Sohn et al. |
| 2007/0112224 A1 | 5/2007 | Krafft et al. |
| 2007/0170122 A1 | 7/2007 | Tabata et al. |
| 2007/0251831 A1 | 11/2007 | Kaczur et al. |
| 2007/0293707 A1 | 12/2007 | Wolfert et al. |
| 2008/0021209 A1 | 1/2008 | East et al. |
| 2008/0053836 A1 | 3/2008 | Bulan et al. |
| 2008/0146753 A1 | 6/2008 | Woike et al. |
| 2008/0154050 A1 | 6/2008 | Gilbeau |
| 2008/0161613 A1 | 7/2008 | Krafft et al. |
| 2008/0194847 A1 | 8/2008 | Krafft et al. |
| 2008/0194849 A1 | 8/2008 | Krafft et al. |
| 2008/0194850 A1 | 8/2008 | Krafft et al. |
| 2008/0194851 A1 | 8/2008 | Gilbeau |
| 2008/0200642 A1 | 8/2008 | Krafft |
| 2008/0200701 A1 | 8/2008 | Krafft et al. |
| 2008/0207930 A1 | 8/2008 | Gilbeau et al. |
| 2008/0210884 A1 * | 9/2008 | Egberts | 250/429 |
| 2008/0214848 A1 | 9/2008 | Krafft et al. |
| 2008/0281132 A1 | 11/2008 | Krafft et al. |
| 2009/0022653 A1 | 1/2009 | Strebelle et al. |
| 2009/0131631 A1 | 5/2009 | Krafft et al. |
| 2009/0173636 A1 | 7/2009 | Ooms et al. |
| 2009/0198041 A1 | 8/2009 | Krafft et al. |
| 2009/0270588 A1 | 10/2009 | Krafft et al. |
| 2009/0275726 A1 | 11/2009 | Krafft et al. |
| 2010/0029959 A1 | 2/2010 | Fan et al. |
| 2010/0032617 A1 | 2/2010 | Gilbeau et al. |
| 2010/0105862 A1 | 4/2010 | Krafft et al. |
| 2010/0105964 A1 | 4/2010 | Krafft et al. |
| 2010/0168379 A1 | 7/2010 | Krafft et al. |
| 2010/0170805 A1 | 7/2010 | Krafft et al. |
| 2010/0179300 A1 | 7/2010 | Boulos et al. |
| 2010/0179302 A1 | 7/2010 | Krafft et al. |
| 2010/0212540 A1 | 8/2010 | Bobet et al. |
| 2010/0294727 A1 | 11/2010 | Gilbeau et al. |
| 2010/0305271 A1 | 12/2010 | Mentink et al. |
| 2010/0305367 A1 | 12/2010 | Borremans |

(56) References Cited

U.S. PATENT DOCUMENTS

| | | |
|---|---|---|
| 2010/0311874 A1 | 12/2010 | Mentink et al. |
| 2010/0311905 A1 | 12/2010 | Mentink et al. |
| 2010/0311942 A1 | 12/2010 | Gilbeau et al. |
| 2011/0028683 A1 | 2/2011 | Gilbeau et al. |
| 2011/0086949 A1 | 4/2011 | Mentink et al. |
| 2011/0118390 A1 | 5/2011 | Feron et al. |
| 2011/0152545 A1 | 6/2011 | Balthasart et al. |
| 2011/0166369 A1 | 7/2011 | Krafft et al. |
| 2011/0195148 A1 | 8/2011 | Mentink et al. |
| 2011/0237773 A1 | 9/2011 | Gilbeau |
| 2012/0010420 A1 | 1/2012 | Gilbeau et al. |
| 2012/0199493 A1 | 8/2012 | Krafft et al. |
| 2012/0199786 A1 | 8/2012 | Gilbeau |
| 2013/0032755 A1 | 2/2013 | Gilbeau |

FOREIGN PATENT DOCUMENTS

| | | |
|---|---|---|
| CN | 1135533 A | 11/1996 |
| CN | 1296003 A | 5/2001 |
| CN | 101041421 | 9/2007 |
| DE | 58396 C | 8/1891 |
| DE | 180668 C | 1/1906 |
| DE | 197308 C | 11/1906 |
| DE | 238341 C | 3/1908 |
| DE | 197309 C | 4/1908 |
| DE | 869 193 | 3/1953 |
| DE | 955 233 | 1/1957 |
| DE | 1041488 B | 10/1958 |
| DE | 1075103 B | 2/1960 |
| DE | 1226554 B | 10/1966 |
| DE | 2 241 393 | 2/1974 |
| DE | 25 21 813 | 12/1975 |
| DE | 3003819 A1 | 8/1981 |
| DE | 3243617 | 5/1984 |
| DE | 216471 A1 | 12/1984 |
| DE | 3721003 C1 | 12/1988 |
| DE | 43 02 306 | 8/1994 |
| DE | 4335311 A1 | 4/1995 |
| DE | 10203914 C1 | 10/2003 |
| DE | 10254709 A1 | 6/2004 |
| EP | 0 296 341 | 12/1988 |
| EP | 0317184 A2 | 5/1989 |
| EP | 0317185 A2 | 5/1989 |
| EP | 0347618 A2 | 12/1989 |
| EP | 0358255 A1 | 3/1990 |
| EP | 0421379 A1 | 4/1991 |
| EP | 0 452 265 | 10/1991 |
| EP | 0518765 A1 | 12/1992 |
| EP | 0522382 A1 | 1/1993 |
| EP | 0535949 B1 | 4/1993 |
| EP | 0561441 A1 | 9/1993 |
| EP | 0563720 A1 | 10/1993 |
| EP | 0568389 A1 | 11/1993 |
| EP | 0582201 A2 | 2/1994 |
| EP | 0 618 170 | 10/1994 |
| EP | 0 916 624 | 5/1999 |
| EP | 0919551 A1 | 6/1999 |
| EP | 0 774 450 | 2/2000 |
| EP | 0979671 A1 | 2/2000 |
| EP | 1059278 A2 | 12/2000 |
| EP | 1106237 A1 | 6/2001 |
| EP | 1153887 A2 | 11/2001 |
| EP | 1163946 A1 | 12/2001 |
| EP | 1231189 A1 | 8/2002 |
| EP | 1298154 A1 | 4/2003 |
| EP | 1411027 A1 | 4/2004 |
| EP | 1752435 A1 | 2/2007 |
| EP | 1752436 A1 | 2/2007 |
| EP | 1760060 A1 | 3/2007 |
| EP | 1762556 A1 | 3/2007 |
| EP | 1770081 A1 | 4/2007 |
| EP | 1772446 A1 | 4/2007 |
| EP | 1775278 A1 | 4/2007 |
| EP | 2085364 | 8/2009 |
| FR | 1056360 A | 2/1954 |
| FR | 1 306 231 | 10/1961 |
| FR | 1 417 388 | 10/1964 |
| FR | 1 577 792 | 8/1965 |
| FR | 1476073 A | 4/1967 |
| FR | 2151107 | 4/1973 |
| FR | 2180138 | 5/1973 |
| FR | 2 217 372 | 2/1974 |
| FR | 2565229 A1 | 12/1985 |
| FR | 2752242 A1 | 2/1998 |
| FR | 2862644 A1 | 5/2005 |
| FR | 2868419 A1 | 10/2005 |
| FR | 2869612 A1 | 11/2005 |
| FR | 2869613 A1 | 11/2005 |
| FR | 2872504 A1 | 1/2006 |
| FR | 2881732 A1 | 8/2006 |
| FR | 2885903 A1 | 11/2006 |
| FR | 2 912 743 | 8/2008 |
| FR | 2913683 | 9/2008 |
| FR | 2913683 A1 | 9/2008 |
| FR | 2 917 411 | 12/2008 |
| FR | 2918058 A1 | 1/2009 |
| FR | 2925045 A1 | 6/2009 |
| FR | 2927083 A1 | 8/2009 |
| FR | 2929611 A1 | 10/2009 |
| FR | 2935699 A1 | 3/2010 |
| FR | 2935968 A1 | 3/2010 |
| GB | 14767 A | 0/1914 |
| GB | 406345 | 8/1932 |
| GB | 404938 A | 1/1934 |
| GB | 467481 A | 6/1937 |
| GB | 541357 A | 11/1941 |
| GB | 679536 A | 9/1952 |
| GB | 702143 A | 1/1954 |
| GB | 724222 A | 2/1955 |
| GB | 736641 A | 9/1955 |
| GB | 758665 A | 10/1956 |
| GB | 799567 A | 8/1958 |
| GB | 984446 A | 2/1965 |
| GB | 984633 A | 3/1965 |
| GB | 1046521 A | 10/1966 |
| GB | 1083594 A | 9/1967 |
| GB | 1286893 A | 8/1972 |
| GB | 1387668 A | 3/1975 |
| GB | 1 493 538 | 4/1975 |
| GB | 1414976 A | 11/1975 |
| GB | 2173496 A | 10/1986 |
| GB | 2336584 A | 10/1999 |
| HU | 2002-003023 | 3/2004 |
| JP | 3927230 B2 | 11/1939 |
| JP | 50-062909 | 5/1975 |
| JP | 51021635 B | 7/1976 |
| JP | 55041858 A | 3/1980 |
| JP | 5629572 | 3/1981 |
| JP | 5699432 | 8/1981 |
| JP | 56-155009 A | 12/1981 |
| JP | 60-258171 A | 12/1985 |
| JP | 61-044833 A | 3/1986 |
| JP | 61 112066 A | 5/1986 |
| JP | 61-140532 A | 6/1986 |
| JP | 61236749 A | 10/1986 |
| JP | 61-120688 | 6/1987 |
| JP | 62242638 A | 10/1987 |
| JP | 62-278290 | 12/1987 |
| JP | 63195288 A | 8/1988 |
| JP | 2-137704 | 5/1990 |
| JP | 03014527 A | 1/1991 |
| JP | 3223267 A | 10/1991 |
| JP | 03223267 A | 10/1991 |
| JP | 04089440 A | 3/1992 |
| JP | 04-217637 | 8/1992 |
| JP | 6-9589 A | 1/1994 |
| JP | 625196 B2 | 4/1994 |
| JP | 06184024 A | 7/1994 |
| JP | 6321852 A | 11/1994 |
| JP | 08-003087 A | 1/1996 |
| JP | 859593 | 3/1996 |
| JP | 09299953 A | 11/1997 |
| JP | 10139700 A | 5/1998 |

(56) References Cited

FOREIGN PATENT DOCUMENTS

| | | |
|---|---|---|
| JP | 10218810 A | 8/1998 |
| JP | 1998218810 A | 8/1998 |
| JP | 20000344692 A | 12/2000 |
| JP | 2001-037469 | 2/2001 |
| JP | 2001-213827 A | 8/2001 |
| JP | 2001-261308 | 9/2001 |
| JP | 2001-1261581 A | 9/2001 |
| JP | 2001276572 A | 10/2001 |
| JP | 2002-02033 A2 | 1/2002 |
| JP | 20020038195 A | 2/2002 |
| JP | 2002-256494 | 9/2002 |
| JP | 20020265986 A | 9/2002 |
| JP | 2002-363153 A | 12/2002 |
| JP | 2003-502154 | 1/2003 |
| JP | 2003-89680 A | 3/2003 |
| JP | 2003081891 A | 3/2003 |
| JP | 2003183191 A | 7/2003 |
| JP | 2003206473 A | 7/2003 |
| JP | 2004-130263 | 4/2004 |
| JP | 2004518102 A | 6/2004 |
| JP | 2004216246 A | 8/2004 |
| JP | 2005007841 A2 | 1/2005 |
| JP | 2005097177 A2 | 4/2005 |
| JP | 2005513064 A | 5/2005 |
| JP | 2005-154292 A | 6/2005 |
| JP | 2006-052434 | 2/2006 |
| JP | 2007-008898 | 1/2007 |
| JP | 2007-185578 | 7/2007 |
| JP | 2009-263338 | 11/2009 |
| KR | 900006513 | 11/1987 |
| KR | 1019920003099 B1 | 4/1992 |
| KR | 10-514819 B1 | 9/2005 |
| PL | 136598 | 3/1986 |
| PL | 162910 | 1/1994 |
| SU | 123153 | 1/1959 |
| SU | 1125226 | 11/1984 |
| SU | 1159716 | 6/1985 |
| SU | 1685969 | 10/1991 |
| WO | WO 95/14635 A1 | 6/1995 |
| WO | WO 95/14639 | 6/1995 |
| WO | WO 96/15980 | 5/1996 |
| WO | WO 97/48667 | 12/1997 |
| WO | WO 96/07617 | 3/1998 |
| WO | WO 98/37024 | 8/1998 |
| WO | WO 99/14208 | 3/1999 |
| WO | WO 9932397 A1 | 7/1999 |
| WO | WO 0024674 A1 | 5/2000 |
| WO | WO 01/43762 A2 | 6/2001 |
| WO | WO 0141919 A1 | 6/2001 |
| WO | WO 0186220 A2 | 11/2001 |
| WO | WO 02/26672 A2 | 4/2002 |
| WO | WO 02059536 A | 8/2002 |
| WO | WO 03/064357 | 8/2003 |
| WO | WO 2004/056758 | 7/2004 |
| WO | WO 2005021476 A1 | 3/2005 |
| WO | WO 2005054167 A1 | 6/2005 |
| WO | WO 2005/075189 A2 | 8/2005 |
| WO | WO 2005/097722 | 10/2005 |
| WO | WO 2005/115954 | 12/2005 |
| WO | WO 2005/116004 | 12/2005 |
| WO | WO 2006020234 A1 | 2/2006 |
| WO | WO 2006/100311 A2 | 9/2006 |
| WO | WO 2006/100312 A2 | 9/2006 |
| WO | WO 2006/100313 A2 | 9/2006 |
| WO | WO 2006/100314 A1 | 9/2006 |
| WO | WO 2006/100315 A2 | 9/2006 |
| WO | WO 2006/100316 A1 | 9/2006 |
| WO | WO 2006/100317 A1 | 9/2006 |
| WO | WO 2006/100318 A2 | 9/2006 |
| WO | WO 2006/100319 A1 | 9/2006 |
| WO | WO 2006/100320 A2 | 9/2006 |
| WO | WO 2006/106153 A2 | 10/2006 |
| WO | WO 2006/106154 A1 | 10/2006 |
| WO | WO 2006/106155 A2 | 10/2006 |
| WO | WO 2007/054505 A2 | 5/2007 |
| WO | WO2007/144335 | 12/2007 |
| WO | WO 2008/101866 | 8/2008 |
| WO | WO2008/107468 | 9/2008 |
| WO | WO 2008/110588 | 9/2008 |
| WO | WO2008/145729 | 12/2008 |
| WO | WO 2008/147473 | 12/2008 |
| WO | WO 2008/152044 | 12/2008 |
| WO | WO 2008/152045 | 12/2008 |
| WO | WO2009/000773 | 12/2008 |
| WO | WO 2008152043 A1 | 12/2008 |
| WO | WO 2009/016149 A2 | 2/2009 |
| WO | WO 2009026212 A1 | 2/2009 |
| WO | WO2009/043796 A1 | 4/2009 |
| WO | WO 2009/077528 | 6/2009 |
| WO | WO 2009/077528 A1 | 6/2009 |
| WO | WO 2009/095617 A2 | 8/2009 |
| WO | WO 2009/095618 A2 | 8/2009 |
| WO | WO 2009/095622 A2 | 8/2009 |
| WO | WO 2009/121853 | 10/2009 |
| WO | WO2009/121853 A1 | 10/2009 |
| WO | WO 2009/150385 A2 | 12/2009 |
| WO | WO 2010/010282 A1 | 1/2010 |
| WO | WO 2010/029039 | 3/2010 |
| WO | WO 2010/029039 A1 | 3/2010 |
| WO | WO 2010/029153 | 3/2010 |
| WO | WO 2010/029153 A1 | 3/2010 |
| WO | WO 2010/043813 A1 | 4/2010 |
| WO | WO 2010/066660 | 6/2010 |
| WO | WO 2010/136725 A1 | 12/2010 |
| WO | WO 2011054769 A2 | 5/2011 |
| WO | WO 2011054770 A1 | 5/2011 |
| WO | WO 2012025468 A1 | 1/2012 |
| WO | WO 2012016872 A1 | 2/2012 |
| WO | WO 2012/041816 A1 | 4/2012 |
| WO | WO 2012/056005 | 5/2012 |

OTHER PUBLICATIONS

Perry's Chemical Engineers Handbook, Sixth Edition, McGraw Hill Inc., (1984) Section 18.

Vol. B3: Unit Operations II of Ullmann's Encyclopedia of Industrial Chemistry, Fifth Completely Revised Edition, Published by VCH, 1988.

W. Giger et al., "14C/12C-Ratios in Organic Matter and Hydrocarbons Extracted from Dated Lake Sediments," Nuclear Instruments and Methods in Physics Research B5 (1984), 394-397. XP-002631954.

Jurgen O. Metzger, "Fats and Oils as Renewable Feedstock for Chemistry," Eur. J. Lipid Sci. Technol. (2009), 111, 865-876 XP-002631953.

Bruce M. Bell, "Glycerin as a Renewable Feedstock for Epichlorohydrin Production. The GTE Process," Clean-Soil, Air, Water, vol. 36, No. 8, (2008) pp. 657-661. XP-002631952.

Horsley, Lee H.—"Azeotropic Data-III", The Dow Chemical Co., Midland, MI, American Chemical Society 1973; pp. 1-4; 4 pgs.

Suzawa, Yoshikazu, et al—"Incineration System for Waste Liquid Containing Chlorinated Organic Compounds", Chemical Apparatuses, 1981, vol. 23, No. 11; 34 pgs; Translation in English provided.

D'Alonzo, R.P., et al—"Glyceride Composition of Processed Fats and Oils As Determined by Glass Capillary Gas Chromatography", Journal of American Oil Chemists' Society, 1982, vol. 59, No. 7, pp. 292-295; 4 pgs.

Chemical Engineering Handbook, 6$^{th}$ Revised Edition, 2001, pp. 1-36; 56 pgs; Translation in English provided.

"Electrolytic cell test for electrolysis of epoxy sewage salt to prepare chlor-alkali", Process Equipment Department of Research Institute of Chloro-Alkali, Shengyang Chemical Plant, Liaoning Chemical Industry, Issue n°2, pp. 32-37, published Dec. 31, 1981; 17 pgs; Translation in English provided.

Chengxin, Ren, et al—"Analysis on the Composition of the Byproduct During the Manufacturing Process of S-Epichlorohydrin by GC-MS", Chemical Analysis and Meterage, 2003, vol. 12, Issue No. 3, pp. 25-26; 6 pgs; Translation in English provided.

Encyclopedia of Chemical Technology, vol. 5, Nov. 1993; 6 pgs; Translation in English provided.

"Manufacture and use of epoxy resin", edited by Shanghai Resin Factory, published by China Petrochemical Press, First Edition, Oct. 1974; 16 pgs; Translation in English provided.

(56) References Cited

OTHER PUBLICATIONS

Gilman, Henry, et al—"Organic synthesis", Part 1, published by Scientific Publishing, 1957 (with abstract); 4 pgs.
Handbook of Chemical Products, Heavy Organic Chemicals, Second edition, published by Chemical Industry Press, Jan. 1995; 13 pgs; Translation in English provided.
Kiseleva, R. A., et al—"Study of the Interaction of Dibasic Acids with Glycerol", J. App. Chem. USSR, 1971, vol. 44, pp. 2086-2090; 5 pgs.
Handbook of Corrosion Data and Material Selection, published by Chemical Industry Press, edited by Jingyi Zuo, Yu Zuo; First edition, Oct. 1995, 5 pgs; Translation in English provided.
Handbook of Azeotropic Mixture, edited by Information Department of Comprehensive Scientific Technology Research Institution of Fushun City, 1993; 8 pgs; Translation in English provided.
"Industry Chemical Reaction and Application", published by Chinese Scientific Technology University Press, 1999; 4 pgs; Translation in English provided.
"Epoxy resin", published by Shanghai People's Publishing House, 1971; Translation in English provided; 21 pgs.
Boschan, Robert, et al—"The Role of Neighboring Groups in Replacement Reactions. XXI. Front-side Participation of Acetoxy Group. Catalytic Effect of Acetic Acid on the Reaction of Glycols with Hydrogen Chloride", Journal of the American Chemical Society, 1956, vol. 78, pp. 4921-4925; 5 pgs.
Encyclopedia for Chinese Adult Education, 1994, p. 623; 10 pgs; Translation in English provided.
[Unknown Author]—New Experimental Chemical Course 1, Basic Operation I, Section 4, Separation and Purification, pp. 251-252 (issued on Sep. 20, 1975) with English translation from Shiga International Patent Office, 3 pgs.
March, Jerry—"Reactions, Mechanisms & Structure", Advanced Organic Chemistry, 4th Ed., 1992, pp. 889, 908 and 937; 5 pgs.
[Unknown Author]—Bulletin de la Société Chimique de Paris— "Analyse des Travaux de Chimie Pure et Appliquée", G. Masson, Editor, Paris, Jul. 4, 1873, Novelle Série, Tome XIX, pp. 97-99; 4 pgs ; comments regarding Friedel & Silva's work on middle of p. 98.
Neuberg, Irene Stephanie—"A New Way of Preparing Glyceraldehyde from Glycerol", Kaiser Wilhelm Institute in Berlin for Biochemi-Dahlem, 1930; 3 pgs; Includes abstract in English.
Krausz, Francois—'Recherches sur les Aldehydes Substitues en α en β. α and β Substituted Aldehydes', University Strasbourg, France ; Ann Chim 12, Nov.-Dec. 1949, 4, pp. 811-831, 23 pgs ; Includes abstract in English.
[Unknown Author]—"Glycerine—An Overview"—by The Soap and Detergent Association, Glycerine and Oleochemical Division, 1990; 27 pgs.
[Unknown Author]—"Commercial Synthesis of Glycerol Begins a New Shell Chemical Corp Plant—A staff Report"; Chemical & Engineering News, 1948, vol. 26, No. 38, pp. 2770-2771; 2 pgs.
Fairbourne, Arthur, et al—"The Partial Esterification of Polyhydric Alcohols . Part XII . The Funstion of Ethylene-oxide Rings", J. Chem. Soc. 1932, republished 1965, , pp. 1965-1972; 8 pgs.
Clarke, H.T., et al—"Epichlorohydrin", Organic Syntheses, Coll. vol. 1, pp. 233 (1941) ; vol. 3, p. 47 (1923); 2 pgs.
Braun, Geza—"Epichlorohydrin and Epibromohydrin", Organic Syntheses, Coll. vol. 2, p. 256 (1943) ; vol. 16, p. 30 (1936); 2 pgs.
Conant, J.B., et al—"Glycerol α,γ-Dichlorohydrin", Organic Syntheses, Coll. vol. 1, p. 292 (1941); vol. 2, p. 29 (1922); 3 pgs.
Chavanne, G.—"Memoires Presentes a La Societe Chimique", English translation—"Reports Submitted to Chemical Firm", Bull. Soc. Chim. Fr. 1943, 1, EP 06 121 086; 16 pgs.
Schroder, Angela, et al—"Glycerol as a by-product of biodiesel production in Diets for ruminants", 1999, The Regional Institute, Institute of Animal Nutrition, Physiology and Metabolism, University of Kiel, Germany, 6 pgs.
[Unknown Author]—"Chemical Properties and Derivatives of Glycerol", 1965, Glycerine Producer's Association, 1st Edition, 23 pgs.
Busby, G.W., et al—"The Purification of Glycerin by Ion-Exchange", The Journal of the American Oil Chemists' Society, 1952, 3 pgs.
Lamborn, Leebert Lloyd—"Modern Soaps, Candles and Glycerin", 3rd Edition, 1918, D. Van Nostrand Company, London, 12 pgs.
Knothe, Gerhard—"Historical perspectives on vegetable oil-based diesel fuels", Industrial Oils, 2001, vol. 12, pp. 1103-1107; 5 pgs.
Schuchardt, Ulf, et al—"Transesterification of Vegetable Oils: A Review", 1998, Braz. Chem Soc., vol. 9, No. 1, pp. 199-210; 12 pgs.
Claude, Sylvain—"Research of new outlets of glycerol-recent developments in France"—1999, Fett/Lipid, No. 3, Wiley-VCH Verlag GmbH, Weinheim, pp. 101-104; 4 pgs.
Prakash, Chandra B.—"A Critical Review of Biodiesel as a Transportation Fuel in Canada", 1998, GCSI—Global Change Strategies International Inc.; 119 pgs.
Fukuda, Hideki, et al—"Review—Biodiesel Fuel Production by Transesterification of Oils", 2001, Journal of Bioscience and Bioengineering; vol. 92, No. 5, pp. 405-416; 12 pgs.
Yong, K.C., et al—"Refining of Crude Glycerine Recovered From Glycerol Residue by Simple Vacuum Distillation", Dec. 2001, Journal of Oil Palm Research, vol. 13, No. 2, pp. 39-44, 6 pgs.
RD 436093 A, Aug. 10, 2000.
D. F. Laine. et. al.—"The destruction of organic pollutants under mild reaction conditions: A review" ; Microchemical Journal, 2007, vol. 85, Issue 2, pp. 184-193 (11 pgs).
Ullmann's Encyclopedia of Industrial Chemistry, 2005, "pH Measurement and Control", Wiley-VCH GmbH & Co. KGaA, Weinheim, 10.1002/14356007.e19_e01; pp. 1-31 (32 pgs).
Ullmann's Encyclopedia of Industrial Chemistry, Fifth Completely Revised Edition, Chlorine, vol. A6 1986, pp. 401-477 (85 pgs).
Perry's Chemical Engineers' Handbook, "Heat Transfer Equipment", Section 11 of the 7th Edition, 1997; pp. 11-1 to 11-118 (118 pgs).
U.S. Appl. No. 60/734,659, filed Nov. 8, 2005.
U.S. Appl. No. 60/734,627, filed Nov. 8, 2005.
U.S. Appl. No. 60/734,657, filed Nov. 8, 2005.
U.S. Appl. No. 60/734,658, filed Nov. 8, 2005.
U.S. Appl. No. 60/734,635, filed Nov. 8, 2005.
U.S. Appl. No. 60/734,634, filed Nov. 8, 2005.
U.S. Appl. No. 60/734,637, filed Nov. 8, 2005.
U.S. Appl. No. 60/734,636, filed Nov. 8, 2005.
U.S. Appl. No. 60/560,676, filed Apr. 8, 2004, Gilbeau, et al.
U.S. Appl. No. 61/013,680, filed Dec. 14, 2007, Krafft, et al.
U.S. Appl. No. 61/013,704, filed Dec. 14, 2007, Gilbeau, et al.
U.S. Appl. No. 61/013,676, filed Dec. 14, 2007, Borremans.
U.S. Appl. No. 61/013,707, filed Dec. 14, 2007, Krafft, et al.
U.S. Appl. No. 61/013,672, filed Dec. 14, 2007, Krafft, et al.
U.S. Appl. No. 61/013,713, filed Dec. 14, 2007, Gilbeau.
U.S. Appl. No. 61/013,710, filed Dec. 14, 2007, Krafft, et al.
U.S. Appl. No. 61/007,661, filed Dec. 14, 2007, Boulos, et al.
Herman A. Bruson, et al., "Thermal Decomposition of Glyceryl Carbonates," Journal of the American Chemical Society, vol. 74, Apr. 1952 (1952-4) pp. 2100-2101.
Chemicals Guide, Chemical Daily Co., Ltd. (Published on Jun. 15, 1990) with attached English translation of relevant excerpts.
Perry's Chemical Engineers Handbook 7th Ed., 13th Section, 1997, pp. 13.1-13.108.
Perry's Chemical Engineers Handbook 7th Ed., 15th Section, 1997, pp. 15.1-15.47.
Ullmann's Encyclopedia of Industrial Chemistry 5th Ed., vol. A23, 1993, pp. 635-636.
Ullmann's Encyclopedia of Industrial Chemistry 5th Ed., vol A13, 1989, p. 289.
Ullmann's Encyclopedia of Industrial Chemistry 5th Ed., vol. A11, 1988, pp. 354-360.
Application No. FR 06.05325 filed Jun. 14, 2006 by Solvay S.A.— priority document to EP2007/55742 published as WO 2007/144335 (attached herein) 17 pgs.
Application No. FR 07.53863 filed Mar. 15, 2007 by Solvay S.A. and published as FR2913683, 19 pgs (attached herein)—priority document to EP2007/55742 published as WO2007/144335 29 pgs (attached herein).

(56) References Cited

OTHER PUBLICATIONS

Gibson, "The preparation, properties, and uses of glycerol derivatives, Part III. The Chlorohydrins", 1931, Chemistry and Industry, Chemical Society, pp. 949-975.
Carre et al, 1931, "La transformation des alcools polyatomiques en mono-et en polychlorohydrines au moyen du chlorure de thionyle", Bulletin De La Societe Chimique De France, Societe Francaise De Chimie. Paris—ISSN 0037-8968, vol. 49, No. 49, pp. 1150-1154.
Fauconner, 1888, "Preparation de l'epichlorhydrine", Bull. Soc. Chim. FR, No. 50, pp. 212-214 (with enclosed translation in English).
Ullmann'S Encyclopedia of Industrial Chemistry, "Industrially important epoxides", 1987, Fifth Completely Revised Edition, vol. A9, pp. 539-540.
Bonner et al, "The composition of constant boiling hydrochloric acid at pressures of 50 to 1220 millimeters", 1930, Journal of American Chemical Society, vol. 52, pp. 633-635.
Muskof et al, "Epoxy Resins" in Ullmann's Encyclopedia of Industrial Chemistry, 1987, 5th Ed., vol. A9, pp. 547-563.
Novelli, A., "The preparation of mono-and dichlorohydrins of glycerol", 1930, Anales Farmacia Bioquimica, vol. 1, pp. 8-19 (with English abstract).
Derwent Publications, AN 109:6092 CA, JP 62-242638, Oct. 23, 1987, 1 pg.
Derwent Publications, AN 1987-338139 [48], JP 62-242638, Oct. 23, 1987, 1 pg.
I. Miyakawa et al, Nagoya Sangyo Kagaku Kenkyusho Kenkyu Hokoku, 10, 49-52 (1957). (Abstract in English only). 1 pg.
Han Xiu-Ying et al, Shanxi Daxue Xuebao Bianjibu, 2002, 25(4), 379-80. (Abstract in English only), 1 pg.
Semendyaeva et al, 1981. Khimicheskaya Promyshlennost, Seriya: Khomaya Promyshlennost, 5. 21-2 (CA Summary). XP 002465275, 1 pg.
Rudnenko, Ev, et al., 1988, Lakokrasochnye Materially i 1kh Primenenie, 4 69-71 (CA Summary) XP 002465276, 1 pg.
Kirk-Othmer Encyclopedia of Chemical Technology, 1978, 3rd Ed., vol. 4, Blood, Coagulants and Anticoagulants to Cardiovascular Agents. p. 847-848.
Jeffrey Lutje Spelberg, et al, A Tandem Enzyme Reaction to Produce Optically Active Halohydrins, Epoxides and Diols, Tetrahedron: Asymmetry, Elsevier Science Publishers, vol. 10, No. 15, 1999, pp. 2863-2870.
Oleoline.com. Glycerine Market report, Sep. 10, 2003, No. 62, 31 pgs.
Notification Under Act. No. 100/2001, Coll. As Amended by Act No. 93/2004, Coll. To the extent of Annex No. 4 (SPOLEK) Nov. 30, 2004, 80 pgs.
Documentation Under Act. No. 100/2001 Coll. As Amended by Act. No. 93/2004 Coll in the scope of appendix No. 4 (SPOLEK) Jan. 11, 2005, 86 pgs.
K. Weissermel & H.J. Arpe, Industrial Organic Chemistry, Third, Completely Revised Edition, VCH, 1997, pp. 149 & 275.
Industrial Bioproducts: "Today and Tomorrow." Energetics, Inc. for the U.S. Department of Energy, Office of Energy Efficiency and Renewable Energy, Office of the Biomass Program, Jul. 2003, pp. 49, 52 to 56.
Kirk Othmer Encyclopedia of Chemical Technology, Fourth Edition, 1992, vol. 2, p. 156, John Wiley & Sons, Inc.
Ullmann's Encyclopedia of Industrial Chemistry, Fifth, Completely Revised Edition, 1988, vol. A13, pp. 292-293.
The Merck Index, Eleventh Edition, 1989, pp. 759-760.
Ullmann's Encyclopedia of Industrial Chemistry, Fifth completely Revised Edition, vol. A1, 1985, pp. 427-429.
Ullmann's Encyclopedia of Industrial Chemistry, Fifth Completely Revised Edition, vol. A6, 1986, pp. 240-252.
Hancock, E.G., Propylene and its Industrial Derivatives, 1973, pp. 298-332.
K. Weissermel & H.J. Arpe, Industrial Organic Chemistry, Third, Completely Revised Edition, VCH 1997, pp. 149-163.
K. Weissermel & H.J. Arpe, in Industrial Organic Chemistry, Third, Completely Revised Edition, VCH 1997, pp. 275-276.
Robert T. Morrison & Robert N. Boyd, Organic Chemistry, 5th Ed., vol. II, pp. 666 to 667 and 712 to 714 (Japanese Translation), published on Jul. 10, 1970, Tokyo Kagaku Dozin Co., Ltd. (and copies of similar passages but retrieved from the English Fifth Edition of the Book, 1987).
Perry's Chemical Engineers' Handbook, Sixth Edition, Robert H. Perry, Don Green, 1984, Section 21-64 to 21-68.
Iwanami et al, Dictionary of Physics and Chemistry, Third Edition, Ryo Midorikawa /Iwanami Shoten, Publishers, May 29, 1971, pp. 270-271, 595 and 726.
Expert Opinion on the Environment Impact Assessment Documentation Pursuant to Annex No. 5 of Act No. 100/2001 Coll., as amended by later regulations of the project/intent combined process for the manufacture of epichlorohydrin (SPOLEK) Apr. 2005.
Kirk Othmer Encyclopedia of Chemical Technology, Third Edition, vol. 12, 1980, pp. 1002-1005.
Chemical Engineering Handbook, the 6th Edition, Edited by the Society of Chemical Engineers, published by Maruzen Co, Ltd., 1999, pp. 1296-1306 Pub. Feb. 25, 1999 w/English translation of p. 1296, Table 28.4, p. 1298, left column, lines 4-13 and p. 1305, Table 28.10.
Product Brochure of De Dietrich Company, Apr. 1996, pp. 3, 8 and 9 w/English translation of p. 8, left column, lines 1-4, p. 9.
The Journal of the American Chemical Society, vol. XLV, Jul.-Dec. 1923, pp. 2771-2772.
Berichte Der Deutschen Chemischen Gesellschaft, 1891, vol. 24, pp. 508-510.
Catalogue of Nittetu Chemical Engineering Ltd. (Published in Mar. 1994).
12093 Chemicals, The Chemical Daily Co., Ltd. (Published on Jan. 22, 1993) with attached English translation of relevant excerpts, 24 pgs.
J.B. Conant, et al, "Glycerol a,y-dichlorohydrin", Organic Syntheses Coll., 1941, vol. 1, p. 292-294 (5 pp.).
Gilman H., Organic Synthesis, Section 1, pp. 234-235 (no date)—attached English translation only.
Industrial Chemical Encyclopedia 5, p. 457 (no date)—attached English translation only.
"Epoxy resins", p. 36-46, by Shangai Resin Plant, Shangai People's Press, 1971—attached English translation only.
Martinetti, R. et al. "Environnement Le Recyclage du l'eau" Industrie Textile, Ste Sippe Sarl, Metz, FR, No. 1300 (Jul. 1, 1998), ISSN: 0019-9176 (no English abstract available)—8 pp.
"Rainwater Harvesting and Utilization" (United Nations Environment Program) Mar. 2002; XP003003726; Internet Citation extracted online on Jan. 1, 2006: URL:http://www.unep.or.ip/letc/ Publication—4 pp.
Myszkowski, J. et al. "Removal of chlorinated organic impurities from hydrogen chloride"; English Chemical Abstract summary only of Polish Patent No. 136598 B2 (Mar. 31, 1986); XP002352444; 1 pp.
Myszkowski, J. et al. "Removal of organic compounds from gaseous hydrogen chloride by an absorption method" Chemia Stosowana (1986) vol. 30(4) p. 545-551; English Chemical Abstract Summary only; XP002352445; 1 pp.
Milchert, E. et al. "Recovering hydrogen chloride and organic chloro compounds from the reaction mixture in the chlorination of ethylene"; English Chemical Abstract Summary only of Polish Patent No. 162910 B1 (Jan. 31, 1994); XP002352443; 1 pp.
Wu, Guoying, et al—"Preparation of Biodiesel and Glycerol by Methyl Esterification of Cottonseed Oil", 2003, China Oil and Fat, vol. 28, Issue No. 4, pp. 70-73; 15 pgs; in Chinese; Translation provided in English.
Zhu, Shiyong—"Production and prospects of the world's natural glycerin", 1997, Cereals and Oils, Issue No. 01, pp. 33-38; 21pgs; in Chinese; Translation provided in English.
Hill, Arthur J., et al—"A Synthesis of Beta-Chloro-Allyl Chloride", 1922, Journal American Chemical Society, vol. 44, Issue No. 11, pp. 2582-2595; 15 pgs.
Physical and Chemical Dictionary (5$^{th}$ Edition), "Glass Lining"; "Porcelain Enamel", 1998; pp. 267, 378, 738, 1298 and 1403; 8 pgs; in Japanese; Partial translations provided in English for pp. 267 and 1298.

(56) References Cited

OTHER PUBLICATIONS

Encyclopedia Chimica, No. 8, (1st Edition), "Enamel, porcelain enamel, vitreous enamel"; 1962; 4 pgs; in Japanese; Partial translation provided in English.
Encyclopedia Chimica, No. 2, (1st Edition), "Glass lining", 1960; 4 pgs; in Japanese; Partial translation provided in English.
Gottlieb, Klaus, et al—"Glycerine—a sustainable raw material", 1994, Chem. Ing. Tech., vol. 66, Issue No. 1, pp. 64-66; 8 pgs; in German; Translation provided in English.
Wessendorf, Richard—"Glycerinderivate als Kraftstoffkomponenten", 1995, Wissenschaft & Technik, Science and Technology, pp. 138-143; 6 pgs; in German; no English translation provided.
Milchert, E., et al—"Dehydrochlorination of Glycerol Dichlorohydrin to Epichlorohydrin", 1995, Chem. Papers, vol. 49, Issue No. 3, pp. 133-136; 4 pgs.
Medium and Long-term Opportunities and Risk of the Biotechnological Production of Bulk Chemicals from renewable Resources—The Potential of White Technology—The BREW project—Final Report—prepared under the European Commission GRXTH Programme (DG Research) Ulrecht, Sep. 2006, (pp. 29-31).
Polymer Science Dictionary, M.S.M., Elsevier Applied Chemistry, London & New York, 1989 p. 86.
Perry's Chemical Engineers' Handbook, 6th Edition, Section 21, pp. 21-55.
M. Schellentrager, "Untersuchungen zur oxidation Entfarbung aus gewahlter Reaktivfarbstoffe: Analyse der Abbauprodukte misteels hochauflosender LC-MS", Dissertation, XP 0002548413 (Jan. 1, 2006) w/ English Abstract.
E. Milchert et al., "Installation for the Recovery of Dichloropropanols and Epichlorohydrin from the Waste Water in Epichlorohydrin Production", Pol. J. Appl. Chem., vol. 41, p. 113-118 (1997).
Kleiboehmer W., et al, Solvay Werk Rheinberg; Integrierte Prozesse Separierte Abwasserbehandlungen—Gewaesserschutz, Wasser, Abwasser 200 (Wissenschaftlich-technische Mitteilungen des Instituts Zur Foerderung der Wasserguerte- und Wassermengenwirtschaft; V;—2005 p. 81/-8/5., vol. 5.
Klaus Weissermel, et al., "Industrial Organic Chemistry," (3rd Completely Revised Edition); VCH 1997. p. 93-98.
Klaus Weissermel, et al., "Industrial Organic Chemistry," (3rd Completely Revised Edition); VCH 1997. p. 276-277.
Klaus Weissermel, et al., "Industrial Organic Chemistry," (3rd Completely Revised Edition); VCH 1997. p. 347-355.
Ying Ling Liu, "Epoxy Resins from Novel Monomers with a Bis-(9,10-dihydro-9-oxa-10-oxide-10-phosphaphenanthrene-10-yl-) Substituent," Journal of Polymer Science: Part A: Polymer Chemistry, vol. 40, 359-368 (2002).
Ying Ling Liu, "Phosphorous-Containing Epoxy Resins from a Novel Synthesis Route," Journal of Applied Polymer Science, vol. 83, 1697-1701 (2002).
Clarke, H.T., et al—"Epichlorohydrin", "Ethyl Acetoacetate", 1964, Organic Syntheses, Collective vol. I, Being a Revised Edition of Annual vols. I-IX, Second Edition, Tenth Printing, John Wiley & Sons, Inc.; pp. 232-235; 6 pgs.
Braun, Geza—"Epichlorohydrin and Epibromohydrin", 1957, Organic Syntheses, Inc., Collective vol. 2, A Revised Edition of Annual vols. X-XIX, Eighth printing, John Wiley & Sons, Inc., pp. 256-258; 5 pgs.
Kirk-Othmer, Encyclopedia of Chemical Technology, Third Edition, vol. 9, Herman F. Mark, et al, Editors—"Epoxy Resins", 1980, pp. 267-290, A Wiley-Interscience Publication, John Wiley & Sons, Inc.; 28 pgs.
Encyclopedia of Experimental Chemistry I, Basic Operation I, edited by the Chemical Society of Japan Nov. 5, 1990, 4th Edition, pp. 161-165 and pp. 184-191, Maruzen Co., Ltd.; 16 pgs.
Encyclopedia of Chemistry 3, edited by Editorial Committee of Encyclopedia of Chemistry, Kyoritsu Shuppan Co., Ltd., Sep. 30, 1960, 1st Edition, 1st printing, pp. 312-313; 2 pgs.
Kaszonyi, A., et al—"Bioglycerol a new platform chemical", 2009, 44th International Petroleum Conference, Bratislava, Slovak Republic; pp. 1-8; 8 pgs.
Williamson, R., et al—"DE-FC36-03GO13000 Final Report: Continuous Isosorbide Production from Sorbitol using Solid Acid Catalysis", 2006, DOE Award for IOWA CORN Promotion Board; 9 pgs.
Malhotra, S. V., et al—"Applications of Corn-Based Chemistry", 2007, The Bridge Publication of the National Academy of Engineering, 2007, vol. 34, Issue No. 4; 8 pgs; Best copy available.
Jaffe, M., et al—"Corn (Sugars) Based Chemistries for the Polymer Industry", 2009, ANTEC, 67th Annual Technical Conf., Proceed., Society of Plastic Engineers, Jun. 22-24, Mc Cormick Place West Chigaco, IL, 6 pgs.
[Unknown Author]—"Iowa Corn Promotion Board, NJIT to License Breakthrough, Safe Bio-Plastic Alternative", Aug. 6, 2008, New Jersey Science & Technology University Press Release; 2 pgs.
[Unknown Author]—"NJIT Patent May Be Able to Replace BPA; Make Consumer Products Safer", Feb. 4, 2010, New Jersey Science & Technology University Press Release; 2 pgs.
Fenouillot, F., et al—"Polymers from renewable 1,4:3,6-dianhydrohexitols (isosorbide isomannide and isoidide): A Review", 2010, Progress in Polymer Science, vol. 35, Issue No. 5, pp. 578-622; 45 pgs.
U.S. Appl. No. 13/813,348, filed Jan. 30, 2013, Patrick Gilbeau, et al.
U.S. Appl. No. 13/818,753, filed Feb. 25, 2013, Patrick Gilbeau, et al.
Trent, D., et al—"Reactive stripping in a rotating packed bed for the production of hypochlorous acid", 1999, BHR Group Conference Series Publication, vol. 38 (Process Intensification for the Chemical Industry), pp. 217-231; 15 pgs.
Vajda, M., et al—"Membrane-Based Extraction Joined with Membrane-Based Stripping in a Circulating Arrangment II. Extraction of Organic Acids", 2003, Chemical Papers, vol. 57, Issue No. 1, pp. 3-10, 9 pgs.
Demarquay, M.—"De la Glycerine de ses Applications a la Chirurgie et a la Medecine", 1863, Librairie de la Faculte de Medecine, Paris, France; 26 pgs; no English translation provided. Best copy available.
Perry's Chemical Engineers' Handbook, Sixth Edition—"Process Control. Temperature Measurements", 1984, McGraw Hill Inc., Section 22, pp. 22-32-22-37; 8 pgs; Best copy available.
Perry's Chemical Engineers' Handbook, Sixth Edition—"Mass Transfer and Gas Absorption", 1984, McGraw Hill Inc., Section 14, pp. 14-1-14-40; 42 pgs; Best copy available.
U.S. Appl. No. 13/755,236, filed Jan. 31, 2013, Krafft, et al.
U.S. Appl. No. 13/709,218, filed Dec. 10, 2012, Boulos, et al.
U.S. Appl. No. 13/832,363, filed Mar. 15, 2013, Krafft, et al.
U.S. Appl. No. 13/878,429, filed Apr. 9, 2013, Balthasart, et al.
U.S. Appl. No. 13/876,003, Patrick Gilbeau, et al.
Perry's Chemical Engineers Handbook, 7th Edition, Section 28, pp. 28-1 to 28-64 (1997).
Perry's Chemical Engineers Handbook, 6th Edition, Section 23, pp. 23-16, 23-17, 23-26 and 23-38 (1984).
Pamphlet, "Corrosion Resistance of Tantalum and Niobium Metals," of Astro Cosmos Company, Bulletin No. 3000, pp. 2-16.
Dupont Teflon PTFE, Fluoropolymer Resin, Properties Handbook, (published Jul. 1996).
Chemical Process and Design Handbook, James Speight, 2002, McGraw-Hill, pp. 1,21-1,23.
Ullmanns Encyklopädie der Technischen Chemie, Band 12, pp. 367-375, Verlag Chemie GmbH, Weinheim/Bergstr, 1976, (A3) (no English translation).
Keith Schroeder, "Glycerine", bailey's Industrial Oil and Fats Products, 6th ed, 2005, pp. 191-222.
Apparate Technik—Bau—Anwendung, 2, Ausgabe, Vulkan Verlag Essen 1997, Thier (no English translation).
Auswahlkritieren fur Aiskleidungen mit Flurkunstoffen, Chemie Technik 1991, 4, S 31-29, Werthmüller (no English translation).

\* cited by examiner

PROCESS FOR DEGRADING ORGANIC SUBSTANCES IN AN AQUEOUS COMPOSITION

CROSS-REFERENCE TO RELATED APPLICATIONS

The present patent application is a U.S. national stage application under 35 U.S.C. §371 of International Application No. PCT/EP2009/050982 filed Jan. 29, 2009 which claims the benefit of the European patent application EP08150925.9 filed on Jan. 31, 2008 and of the European patent application EP 08171544.3 filed on Dec. 12, 2008, the content of both of these applications being incorporated herein by reference.

The present invention is related to a process for degrading substances in an aqueous composition. More specifically it relates to a process for degrading organic substances present in aqueous compositions, by oxidation.

Organic substances are typical contaminants of aqueous effluents originating in chemical processes. Degrading organic contaminants in waste water is a prerequisite before the disposal of such effluent, e.g., before the rejection in environment, since the organic contaminants contributes to the Chemical Oxygen Demand of the effluents, a measure of their oxygen depleting impact on the environment, or when a recycling of the effluent in the chemical process is envisioned.

Chlorine is a reactant currently used for degrading organic contaminants in water by oxidation. Such a process is described in U.S. Pat. No. 5,445,741 of SOLVAY DEUTSCHLAND GmbH. Using chlorine as a source of oxidation agent presents however several drawbacks. Chlorine is a toxic gas. It also reacts with organic compounds to substitute chlorine for hydrogen, yielding chlorinated organic compounds, usually both toxic and more difficult to oxidize. It can also lead to undesirable production of chlorates.

The goal of the present invention is to provide a process for degrading organic compounds which does not present the above drawbacks.

In a first embodiment, the invention therefore relates to a process for degrading organic substances in an aqueous composition comprising a step (a) wherein, in a liquid reaction medium, said aqueous composition is reacted with at least one composition comprising hydroxide ions ($OH^-$) and hypochlorite in a molar ratio between hydroxide and hypochlorite higher than or equal to 0.001 and lower than 1.5, in order to oxidize said organic substances.

One of the characteristics of the invention is related to the ratio between hydroxide and hypochlorite in the aqueous composition comprising hydroxide ions and hypochlorite. Without willing to be bound by any theory, it is believed that when using such a composition, a good compromise can be obtained between the oxidation rate of the organic substances which is targeted, the chlorination of the organic substances to give chlorinated organic substances highly resistant to oxidation which has to be avoided, and the chlorate formation which has to be avoided.

The aqueous solution containing the organic substances to be degraded will also be referred as the aqueous solution to be treated, subsequently in the description.

The organic substances which are present in the aqueous composition to be treated can be organic aliphatic substances, organic aromatic substances, or mixtures thereof. Those substances can optionally contain at least one heteroatom, selected from halogens, preferably fluorine, chlorine, bromine, iodine, chalcogens, preferably oxygen or sulfur, nitrogen, phosphorus and mixture thereof, and selected more preferably from chlorine, oxygen and mixture thereof.

The aliphatic substances can be cyclic, acyclic, saturated or unsaturated hydrocarbons. Those hydrocarbons are cyclic or unsaturated hydrocarbons. Those hydrocarbons are cyclic or acyclic alkanes and alkenes, halogenated cyclic or acyclic alkanes and alkenes, preferably chlorinated, saturated and/or unsaturated aliphatic and/or alicyclic ethers, saturated and/or unsaturated halogenated aliphatic and/or alicyclic ethers, preferably chlorinated, alcohols and halogenated alcohols, preferably chlorinated, ketones and halogenated ketones, preferably chlorinated, aldehydes and halogenated aldehydes, preferably chlorinated, and/or carboxylic acids and halogenated, carboxylic acids, preferably chlorinated.

The aliphatic substances are preferably selected from trichloropropane, preferably 1,2,3-trichloropropane, chloropropenol, preferably 2-chloro-2-propen-1-ol, dichloropropenes, preferably 1,3-dichloropropene cis and 1,3-dichloropropene trans, dichloropropane, preferably 1,3-dichloropropane, dichloropropanols, preferably, 1,3-dichloro-2-propanol and 2,3-dichloro-1-propanol, monochloropropanediols, more preferably 2-chloro-1,3-propanediol and 3-chloro-1,2-propanediol, 2-chloro-1-propanol, 1-chloro-2-propanol, chloroethanol, chloroethers, more preferably chloroethers of crude formula $C_6H_{10}Cl_2O_2$, $C_6H_{12}Cl_2O$, $C_6H_9Cl_3O_2$, $C_6H_{11}Cl_3O_2$, acrolein, methyl glycidyl ether, chloroacetone, methanol, glycerol, ethylene glycol, propylene glycol, butane-1,2-diol, hydroxyacetone, glyceraldehyde, formaldehyde, acetaldehyde, acrolein, formic acid, glycolic acid, acetic acid, propionic acid, lactic acid, succinic acid, oxalic acid, dichloroacetic acid, glycidol, epichlorohydrin, ethylene oxide, propylene oxide, butylene oxide and mixture thereof.

The aromatic substances comprise at least one ring of aromatic nature. They are preferably halogenated aromatic hydrocarbons comprising at least one ring of aromatic nature and one halogen atom. The halogen may be chosen from fluorine, chlorine, bromine, iodine, and is preferably chlorine. The aromatic ring may be mono or polynuclear and is preferably mononuclear. The aromatic substances are preferably selected from mono-, di-, tri-, tetra-, penta- and hexachloro-benzenes and/or naphthalenes, and mixture thereof. The aromatic substance is preferably monochlorobenzene. The aromatic substance may also be oxygenated like phenol, mono- and polychlorophenol, preferably phenol.

The content of the organic substance in the aqueous composition to be treated is usually such that the total organic carbon (TOC) of the aqueous composition to be treated is higher than or equal to 0.1 g C/kg, preferably higher than or equal to 0.5 g C/kg and more preferably higher than or equal to 1 g C/kg. That TOC is usually lower than or equal to 20 g C/kg, preferably lower than or equal to 10 g C/kg and more preferably lower than or equal to 5 g C/kg.

The content of the organic substance in the aqueous composition to be treated is usually such that the chemical oxygen demand (COD) of the aqueous composition to be treated is higher than or equal to 0.25 g O/kg, preferably higher than or equal to 1.25 g O/kg and more preferably higher than or equal to 2.5 g O/kg. That COD is usually lower than or equal to 50 g O/kg, preferably lower than or equal to 25 g O/kg and more preferably lower than or equal to 15 g O/kg.

The aqueous composition to be treated generally contains inorganic compounds, like salts for instance. The salts can be organic salts, inorganic salts or mixture thereof. The inorganic salts are preferred. Inorganic salts are salts for which the constitutive cations and anions do no contain any carbon-hydrogen bond and any carbon-heteroatom bond with the exception of carbon-oxygen bonds. Metal cyanides, for instance, are not considered as inorganic salts. The inorganic salts are selected from alkaline or alkaline-earth chlorides, sulfates, hydrogen sulfates, hydroxides, carbonates, hydrogen carbonates, phosphates, hydrogen phosphates, borates and any mixture thereof, preferably from alkaline or alkaline-earth chlorides, more preferably from sodium and potassium chloride and the salt is most preferably sodium chloride. Aqueous solutions containing sodium chloride are also known as brines. The aqueous solution to be treated according to the process of the invention is often a brine.

The salt content of the aqueous composition to be treated is usually higher than or equal to 5 g/kg, often higher than or equal to 10 g/kg, frequently higher than or equal to 20 g/kg, commonly higher than or equal to 30 g/kg of composition to be treated, preferably higher than or equal to 50 g/kg, more preferably higher than or equal to 100 g/kg, still more preferably higher than or equal to 140 g/kg, yet more preferably higher than or equal to 160 g/kg and most preferably higher than or equal to 200 g/kg. That salt content is usually lower than or equal to 270 g/kg of composition to be treated, preferably lower than or equal to 250 g/kg and most preferably lower than or equal to 230 g/kg.

The aqueous solution to be treated can originate from any process, preferably from processes generating brines contaminated by organic substances. Those are for instance processes for manufacturing epoxides, preferably ethylene oxide, propylene oxide, butylene oxide or epichlorohydrin, processes for manufacturing chlorinated organic compounds, preferably dichloroethane, processes for manufacturing mono- and polyisocyanates, preferably 4,4'-methylenediphenyl diisocyanate (MDI) or toluene diisocyanate (TDI) or hexamethylen-1,6-diisocyanate (HDI). The aqueous composition to be treated can be a mixture of aqueous compositions originating from at least two different manufacturing processes.

The aqueous composition containing the organic substances to be treated originates preferably from a process for manufacturing an epoxide, more preferably for manufacturing an epoxide from glycerol, and most preferably for manufacturing epichlorohydrine from glycerol or from a process for manufacturing a chlorinated organic compound, preferably 1,2-dichloroethane, or from both processes.

The composition containing hypochlorite can be a solid, a solution or a suspension. It is preferably a solid or a solution, and more preferably a solution.

The expression hypochlorite is here intended to designate any compound selected from hypochlorous acid (HOCl), a salt from hypochlorous acid, or a mixture thereof.

The salt from hypochlorous acid can be an organic salt, an inorganic salt or a mixture thereof. This salt is preferably an inorganic salt, preferably selected from ammonium hypochlorite, metal salts of hypochlorite and mixture thereof, more preferably selected from alkaline and alkaline-earth metal hypochlorite, and mixture thereof, still more preferably selected from sodium and calcium hypochlorite, and mixture thereof and this salt is most preferably sodium hypochlorite.

The aqueous composition containing hypochlorite is preferably a solution containing sodium hypochlorite.

The aqueous composition containing hypochlorite and hydroxide ions may in addition contain chlorate.

The expression chlorate is here intended to designate any compound selected from chloric acid ($HClO_3$), a salt from chloric acid, or a mixture thereof.

The salt from chloric acid can be an organic salt, an inorganic salt or a mixture thereof. This salt is preferably an inorganic salt, preferably selected from ammonium chlorate, metal salts of chlorate and mixture thereof, more preferably selected from alkaline and alkaline-earth metal chlorate, and mixture thereof, still more preferably selected from sodium and calcium chlorate, and mixture thereof and this salt is most preferably sodium chlorate.

The aqueous composition containing hypochlorite and hydroxide ions is preferably a solution containing sodium chlorate.

The chlorate molar content of the aqueous composition containing chlorate, hypochlorite and hydroxide ions is usually higher than or equal to 0.1 mmol chlorate/kg, often higher than or equal to 1 mmol/kg, frequently higher than or equal to 2 mmol/kg and more specifically higher than or equal to 5 mmol/kg. That content is usually lower than or equal to 100 mmol chlorate/kg, often lower than or equal to 50 mmol/kg, frequently lower than or equal to 20 mmol/kg and more specifically lower than or equal to 10 mmol/kg.

The aqueous composition containing hypochlorite also contains hydroxide ions $OH^-$ in a molar ratio between hydroxide and hypochlorite ($[OH^-]/[ClO^-]'$) higher than or equal to 0.001 and lower than to 1.5. The molar content of hypochlorite ($[ClO^-]'$) is here intended to designate the sum of the molar contents of hypochlorous acid and salt of hypochlorous acid in the aqueous composition containing hypochlorite. That molar ratio ($[OH^-]/[ClO^-]'$) is preferably higher than or equal to 0.01 and more preferably higher than or equal to 0.05, still more preferably higher than or equal to 0.1, yet more preferably higher than or equal to 0.2 and most preferably higher than or equal to 0.75. That molar ratio is preferably lower than or equal to 1.4, more preferably lower than or equal to 1.2 and most preferably lower than or equal to 1.0.

The aqueous composition containing hypochlorite and hydroxide ions can contain other compounds, like a salt different from the hypochlorous acid salt. That salt can be an organic salt, an inorganic salt or a mixture thereof. The salt is preferably an inorganic salt, preferably selected alkaline or alkaline-earth chlorides, sulfates, hydrogen sulfates, carbonates, hydrogen carbonates, phosphates, hydrogen phosphates, borates and any mixture thereof, preferably from alkaline or alkaline-earth chlorides, more preferably from sodium and potassium chloride and the salt is most preferably sodium chloride. This salt usually results from the process used for preparing the aqueous composition containing hypochlorite.

The salt content, not including the possible salt of hypochlorous acid, of the aqueous composition containing hypochlorite and hydroxide ions is usually higher than or equal to 30 g/kg of composition to be treated, preferably higher than or equal to 50 g/kg, more preferably higher than or equal to 100 g/kg, still more preferably higher than or equal to 140 g/kg, yet more preferably higher than or equal to 160 g/kg and most preferably higher than or equal to 200 g/kg. That salt content is usually lower than or equal to 270 g/kg of composition to be treated, preferably lower than or equal to 250 g/kg and most preferably lower than or equal to 230 g/kg.

The aqueous composition containing hypochlorite and hydroxide ions can be obtained by any means, preferably by dissolving gaseous chlorine in water containing a basic compound like for instance, ammonium hydroxide, an alkaline hydroxide, an alkaline earth hydroxide, or a mixture thereof. Water containing a sodium hydroxide or a calcium hydroxide or a mixture thereof is preferred and water containing sodium hydroxide is more preferred.

The hypochlorite molar content of the aqueous composition containing hypochlorite and hydroxide ions is usually higher than or equal to 0.1 mol hypochlorite/kg, preferably higher than or equal to 0.5 mol/kg, more preferably higher than or equal to 1 mol/kg and most preferably higher than or equal to 1.3 mol/kg. That content is usually lower than or equal to 5 mol hypochlorite/kg, preferably lower than or equal to 3 mol/kg, more preferably lower than or equal to 2 mol/kg and most preferably lower than or equal to 1.7 mol/kg.

The amount of the aqueous composition containing hypochlorite and hydroxide ions added to the aqueous composition to be treated is usually such that the molar ratio between the hypochlorite added and the COD (expressed in mol of O) of the aqueous composition to be treated, before reaction, is higher than or equal to 1, preferably higher than or equal to 1.2 and most preferably higher than or equal to 1.4. That amount is usually such that the molar ratio between the hypochlorite added and the COD (expressed in mol of O) of the aqueous composition to be treated, before reaction, is lower than or equal to 8, preferably lower than or equal to 4 and most preferably lower than or equal to 3.

The liquid reaction medium may be a single-phase or multi-phase medium.

The liquid reaction medium is composed of all of the dissolved or dispersed solid compounds, dissolved or dispersed liquid compounds and dissolved or dispersed gaseous compounds at the temperature and pressure of the reaction. The liquid reaction medium is preferably a multi-phase medium.

The process according to the invention can be carried out in a discontinuous, continuous or semi-continuous mode. The continuous mode is preferred. By continuous mode, one intends to denote a mode wherein the aqueous composition to be treated and the composition comprising hydroxide ions and hypochlorite are continuously fed to the process and wherein the liquid reaction medium is continuously withdrawn from the process. By discontinuous mode, one intends to denote any other mode. The semi-continuous mode can be considered as a discontinuous mode. By the term continuously, one intends to denote without substantial interruption.

In the process according to the invention, the pH at which the reaction of step (a) is carried out is preferably controlled. That pH is preferably controlled and maintained in a given range. The lowest limit of the pH range is generally higher than or equal to 6, preferably higher than or equal to 7 and most preferably higher than or equal to 8. The highest limit of the pH range is generally lower than or equal to 11, preferably lower than or equal to 10 and most preferably lower than or equal to 9. The pH has to be maintained at such set values since pH changes occur during the course of the oxidation reaction. The pH values are given for the reaction conditions of step (a), i.e., temperature, pressure and ionic strength.

In order to maintain the pH in a given range, the pH is measured and adjusted if necessary.

The pH measurement can be done either continuously or periodically. In this last case, the measurement is usually carried out at a frequency sufficiently high to maintain the pH in the set range during at least 80% of the duration of step (a) of the process, often during at least 90%, frequently during at least 95% and in particular during at least 99%.

The pH measurement can be carried out "in situ" in the reaction medium under the reaction conditions or "ex situ" in a sample withdrawn from the reaction medium and brought to an adequate temperature and an adequate pressure to assure a good longevity to the pH measurement equipment. A temperature 25° C. and a pressure of 1 bar are examples of adequate temperature and pressure.

The pH measurement can be carried out by any means. Measurement with a pH sensitive electrode is convenient. Such an electrode should be stable in the reaction medium under the reaction conditions and should not contaminate the reaction medium. Glass electrodes for measuring pH are more particularly convenient. Examples of such electrodes are given in Ullmann's Encyclopedia of Industrial Chemistry,© 2005, Wiley-VCH Verlag GmbH & Co. KGaA, Weinheim 10.1002/14356007.e19_e01, pp. 8-15. Electrodes of the type 405-DPAS-SC-K85 supplied by METTLER TOLEDO® or of the types Ceragel CPS71 and Orbisint CPS11 supplied by ENDRESS+HAUSER® are examples of electrodes that can be used.

The pH can be adjusted and maintained at said values either by addition of an acidic compound or by addition of a basic compound. Any acidic or basic compounds can be used to maintain the pH. Inorganic acids and inorganic bases are preferred. Hydrogen chloride, gaseous and/or in aqueous solution, is a more preferred acidic compound. Sodium or calcium hydroxides, solids and/or in aqueous solution and/or suspensions, are more preferred basic compounds, with sodium hydroxide aqueous solutions being most preferred.

The adjustment can be carried out in an automated or in a non-automated mode. It is preferred to use an automated mode wherein the control of the pH is exerted by a closed circuit known as control loop. Such control loops are described in Ullmann's Encyclopedia of Industrial Chemistry,© 2005, Wiley-VCH Verlag GmbH & Co. KGaA, Weinheim 10.1002/14356007.e19_e01, pp. 24-27. A PROMINENT® DULCOMETER® system type PHD is an example of an automated pH control and adjustment apparatus that can be used.

In the process according to the invention, the temperature at which the reaction of step (a) is carried out, is usually higher than or equal to 10° C., preferably higher than or equal to 30° C., more preferably higher than or equal to 60° C. and most preferably higher than or equal to 80° C. That temperature is usually lower than or equal to 200° C., preferably lower than or equal to 180° C., more preferably lower than or equal to 160° C. and most preferably lower than or equal to 135° C.

In the process according to the invention, the reaction of step (a) can be carried out under a pressure of 1 bar absolute, under a pressure above 1 bar absolute or under a pressure below 1 bar absolute. It is preferred to carry out the reaction of step (a) under a pressure that is regulated or set between 1 and 11 bar absolute, more preferably under a pressure of 1.1 to 7 bar and most preferably under a pressure of 1.1 to 4 bar.

It is preferred to carry out the reaction at the boiling temperature of the liquid reaction medium. Such a procedure has the advantage of allowing the removal of heat sensitive and/or volatile compounds formed during the reaction, for instance bicarbonate, carbonic acid and carbon dioxide.

In the process according to the invention, when step (a) of the process is carried out in a discontinuous mode, the duration of the reaction of step (a) is generally higher than or equal to 0.05 h, preferably higher than or equal to 0.1 h, more preferably higher than or equal to 0.2 h and most preferably higher than or equal to 0.5 h. That duration is usually lower than or equal to 8 h, preferably lower than or equal to 4 h, more preferably lower than or equal to 2 h and most preferably lower than or equal to 1 h. The duration is counted from the time of addition of the composition containing hypochlorite to the aqueous solution to be treated.

In the process according to the invention, when step (a) of the process is carried out in a continuous mode, the residence time of the reaction of step (a) is usually higher than or equal to 0.05 h, preferably higher than or equal to 0.1 h, more preferably higher than or equal to 0.2 h and most preferably higher than or equal to 0.5 h. That residence time is usually lower than or equal to 8 h, preferably lower than or equal to 4 h, more preferably lower than or equal to 2 h and most preferably lower than or equal to 1 h The residence time is defined by the ratio between the volume of the liquid reaction medium and the flow of the liquid reaction medium.

In the process according to the invention, the reaction of step (a) can be carried out in one or more reaction zones, preferably in at least two reaction zones and more preferably in at least three reaction zones. The reactions zones may be composed of volumes assembled in a single jacket or volumes in separate jackets. In the case where the volumes are assembled in a single jacket, the reaction zones may be positioned horizontally or vertically with respect to one another. In any case, the transfer from one zone to another may take place by gravity or by forced circulation. These reaction zones may be placed in any configuration, in series, in parallel or some in series and others in parallel. These reactions zones can be operated under any type of regime, like for instance, mixed regime, preferably perfectly mixed regime or plug flow regime. It is preferred that at least one of the zone is operated under mixed regime, preferably perfectly mixed regime and at least another one is operated under plug flow regime, and it is more preferred that the zone operating under plug flow regime is located after the zone operating under mixed regime, preferably perfectly mixed regime. Such conditions are especially well suited when the process is carried out under continuous mode.

In the process according to the invention, the reaction zones may be supplied independently of one another, with the aqueous composition to be treated, with the aqueous composition containing the hypochlorite, with any other compositions, or with at least two of these compositions. The other composition may comprise for instance the acidic or the basic compound used to adjust the pH of the liquid reaction medium, or a stripping gas to remove volatile reactions products. When several reaction zones are in series, it is preferred to supply the totality or the major part of the aqueous composition containing the hypochlorite in the first reaction zone of the series. Some additional minor parts of the aqueous composition containing the hypochlorite can be added in the next zones of the series. The pH of the liquid reaction medium is preferably adjusted independently in the different reaction zones of the series.

The expression "reaction zones" is understood to mean zones where all the conditions needed for the oxidation reaction are found.

The aqueous composition obtained after the reaction of step (a) exhibits usually reduced COD and TOC levels.

The TOC of the aqueous composition after the reaction step is usually lower than or equal to 100 mg C/kg, preferably lower than or equal to 60 mg C/kg and more preferably lower than or equal to 20 mg C/kg. That TOC is usually higher than or equal to 0.1 mg C/kg.

The COD of the aqueous composition after the reaction step is usually lower than or equal to 250 mg O/kg, preferably lower than or equal to 150 mg O/kg and more preferably lower than or equal to 50 mg O/kg. That COD is usually higher than or equal to 1 mg O/kg.

The compounds responsible for the COD and TOC in the aqueous composition after the reaction of step (a) may be selected from the organic compounds present in the aqueous composition to be treated mentioned above and that have not been oxidized, but also selected from the group consisting of carboxylic acids, aldehydes, ketones or any mixtures thereof.

The carboxylic acid is preferably selected from the group consisting of monocarboxylic, polycarboxylic acids, and mixtures thereof. The monocarboxylic acid and the polycarboxylic acids contain usually from 1 to 10 carbon atoms. The carboxylic acids can contain hetero atoms in their molecule. Oxygen, sulfur, halogens and nitrogen are examples of such heteroatoms. The monocarboxylic acid is more preferably selected from the group consisting of formic acid, acetic acid, dichloracetic acid, propionic acid, butyric acid, glycolic acid, lactic acid and any mixture thereof. The polycarboxylic acid is more preferably selected from the group consisting of oxalic acid, succinic acid, adipic acid, and any mixture thereof.

The ketone is usually selected from the group consisting of acetone, hydroxyacetone, dihydroxyacetone and mixture thereof. The ketone is often hydroxyacetone.

The aldehydes are preferably selected from the group consisting of formaldehyde, acetaldehyde, propionaldehyde, butyraldehyde, glyceraldehyde, acrolein, and any mixture thereof.

The aqueous composition obtained after the reaction of step (a) exhibits usually a chlorate ($[ClO_3^-]'$) content which is usually lower than or equal to 200 mmol $ClO_3^-$/kg, preferably lower than or equal to 100 mmol $ClO_3^-$/kg and more preferably lower than or equal to 50 mmol $ClO_3^-$/kg. That chlorate content is usually higher than or equal to 0.01 mmol $ClO_3^-$/kg. The molar content of chlorate ($[ClO_3^-]'$) is here intended to designate the sum of the molar contents of chloric acid and salt of chloric acid in the aqueous composition.

The aqueous composition obtained after the reaction of step (a) exhibits usually a hypochlorite ($[ClO^-]'$) content which is usually lower than or equal to 100 mmol $ClO^-$/kg, preferably lower than or equal to 50 mmol $ClO^-$/kg and more preferably lower than or equal to 20 mmol $ClO^-$/kg. That hypochlorite content is usually higher than or equal to 0.001 mmol $ClO^-$/kg.

The aqueous composition obtained after the reaction step exhibits usually a salt content, preferably an inorganic salt, preferably selected from alkaline or alkaline-earth chlorides, sulfates, hydrogen sulfates, carbonates, hydrogen carbonates, phosphates, hydrogen phosphates, borates, chlorates, hypochlorites and any mixture thereof, more preferably from alkaline or alkaline-earth chlorides, still more preferably from sodium and potassium chloride and most preferably from sodium chloride, usually higher than or equal to 30 g/kg of composition obtained after the reaction step, preferably higher than or equal to 50 g/kg, more preferably higher than or equal to 100 g/kg, still more preferably higher than or equal to 140 g/kg, yet more preferably higher than or equal to 160 g/kg and most preferably higher than or equal to 200 g/kg. That salt content is usually lower than or equal to 270 g/kg of composition, preferably lower than or equal to 250 g/kg and most preferably lower than or equal to 230 g/kg.

The aqueous composition obtained after the reaction step can be used as such as a starting material in an electrolysis process, preferably in an electrolysis process for producing chlorine.

In a second embodiment, the aqueous composition containing the organic substances contains at least one salt and the process for degrading organic substances in the aqueous composition comprises a further step (b1), wherein, at least part of the reaction medium of step (a) is subjected to an operation selected from the group consisting of cooling, evaporative crystallization, and any combination thereof, in order to precipitate at least part of the salt, followed by a step wherein at least part of the precipitated salt and at least part of the water present in the aqueous composition are recovered.

In a first variant of the second embodiment, the operation is a cooling operation. This operation consists of setting and maintaining the temperature of the reaction medium of step (a) to a temperature lower than the temperature of the reaction of step (a). That temperature is generally lower than 25° C., often lower than or equal to 10° C., frequently lower than or equal to 0° C. and in particular lower than −10° C. That temperature is generally higher than or equal to −22° C. and often higher than or equal to −20° C.

The cooling operation can be carried out in a continuous or discontinuous mode. The continuous mode is preferred.

When the cooling operation is carried out under the discontinuous mode, the duration of the cooling operation is usually higher than or equal to 1 min, often higher than or equal to 10 min and frequently higher than or equal to 20 min. That duration is usually lower than or equal to 6 h, often lower than or equal to 3 h and frequently lower than or equal to 2 h.

When the cooling operation is carried out under the continuous mode, the residence time of the cooling operation is usually higher than or equal to 1 min, often higher than or equal to 10 min and frequently higher than or equal to 20 min. That residence time is usually lower than or equal to 6 h, often lower than or equal to 3 h and frequently lower than or equal to 2 h.

The pressure at which the cooling operation is carried out, is usually higher than or equal to 0.1 bar, often higher than or equal to 0.5 bar and frequently higher than or equal to 0.9 bar. That pressure is usually lower than or equal to 10 bar, often lower than or equal to 5 bar and frequently lower than or equal to 2 bar.

This operation is usually carried out when the concentration of the salt in the reaction medium of step (a) is high, i.e. higher than or equal to 230 g/kg, in particular higher than or equal to 240 g/kg and more particularly higher than or equal to 250 g/kg.

This operation can be carried out at the pH of the reaction medium of step (a) as such or at a modified pH. The operation is preferably carried out after acidification to a pH lower than 5 to eliminate carbonate salts. The pH is then possibly adjusted to a higher value before or during the precipitation. The pH can be modified or adjusted either by addition of an acidic compound or by addition of a basic compound. Any acidic or basic compounds can be used to maintain the pH. Inorganic acids and inorganic bases are preferred. Hydrogen chloride, gaseous and/or in aqueous solution, is a more preferred acidic compound. Sodium or potassium hydroxides, solids and/or in aqueous solution and/or suspensions, are more preferred basic compounds, with sodium hydroxide aqueous solutions being most preferred.

In a second variant of the second embodiment, the operation is a evaporative crystallization operation.

The term "evaporative crystallization" is intended to denote a process resulting in the crystallization of a compound by removing, by evaporation, a compound which promotes its dissolution in the medium. This process is described in "Perry's Chemical Engineers' Handbook" in the 11th section of the 7th edition, 1997.

The temperature at which the evaporative crystallization is carried out is generally higher than 20° C., usually higher than or equal to 40° C., often higher than or equal to 60° C. and frequently higher than or equal to 90° C. That temperature is generally lower than or equal to 200° C. and often lower than or equal to 150° C.

The evaporative crystallization can be carried out at the pH of the reaction medium of step (a) as such or at a modified pH. The operation is preferably carried out after acidification to a pH lower than 5 to eliminate carbonate salts. The pH is then possibly adjusted to a higher value before or during the precipitation. The pH can be modified or adjusted either by addition of an acidic compound or by addition of a basic compound. Any acidic or basic compounds can be used to maintain the pH. Inorganic acids and inorganic bases are preferred. Hydrogen chloride, gaseous and/or in aqueous solution, is a more preferred acidic compound. Sodium or potassium hydroxides, solids and/or in aqueous solution and/or suspensions, are more preferred basic compounds, with sodium hydroxide aqueous solutions being most preferred.

The evaporative crystallization operation can be carried out in a discontinuous or continuous mode. The continuous mode is preferred.

When the evaporative crystallization operation is carried out under the discontinuous mode, the duration of the operation is usually higher than or equal to 1 min, often higher than or equal to 10 min and frequently higher than or equal to 20 min. That duration is usually lower than or equal to 6 h, often lower than or equal to 3 h and frequently lower than or equal to 2 h.

When the evaporative crystallization operation is carried out under the continuous mode, the residence time of the operation is usually higher than or equal to 1 min, often higher than or equal to 10 min and frequently higher than or equal to 20 min. That duration is usually lower than or equal to 6 h, often lower than or equal to 3 h and frequently lower than or equal to 2 h.

The pressure at which the evaporative crystallization operation is carried out, is generally higher than or equal to 0.001 bar absolute. This pressure is generally lower than or equal to 15 bar, usually lower than or equal to 4 bar often lower than or equal to 1 bar, frequently lower than or equal to 0.5 bar and more specifically lower than or equal to 0.1 bar.

This operation is usually carried out when the concentration of the salt in the reaction medium of step (a) is low, i.e. lower than or equal to 270 g/kg, in particular lower than or equal to 250 g/kg and more particularly lower than or equal to 230 g/kg.

In the first variant of the second embodiment, a solid is generally precipitated in the reaction medium submitted to the cooling operation. The reaction medium can be further submitted to a separation operation in order to recover at least one solid and at least one aqueous residue.

The separation operation can be selected from the group consisting of decantation, filtration, centrifugation, and any combination of at least two of them. The separation operation may contain a washing of the separated solid. This washing can be carried out with any liquid. Water is preferred, deionized water is more preferred and distilled water is most preferred. A filtration operation is preferred.

The recovered solid comprises at least one salt. The salt is preferably an inorganic salt, preferably selected from the group consisting of alkaline or alkaline-earth chlorides, sulfates, hydrogen sulfates, carbonates, hydrogen carbonates, phosphates, hydrogen phosphates, borates and any mixture thereof, more preferably from alkaline and alkaline-earth chlorides, still more preferably from sodium and potassium chloride and the salt is most preferably sodium chloride.

The recovered solid is usually a crystalline solid, i.e., a solid of which the X-ray diffraction pattern exhibits well defined diffraction lines.

The salt content of the solid is usually higher than or equal to 300 g/kg, commonly higher than or equal to 400 g/kg, in many cases higher than or equal to 500 g/kg, often higher than or equal to 550 g/kg, frequently higher than or equal to 590 g/kg, specifically higher than or equal to 600 g/kg and in particular higher than or equal to 610 g/kg.

The recovered solid may comprise organic substances. These substances can be those already present in the aqueous composition to be treated, like as defined above, or organic substances formed during the reaction of step (a). The TOC of the recovered solid is usually lower than or equal to 10 mg C/kg, preferably lower than or equal to 5 mg C/kg and more preferably lower than or equal to 2 mg C/kg. That TOC is usually higher than or equal to 0.1 mg C/kg.

The separation operation can be carried out in a continuous or discontinuous mode. The continuous mode is preferred.

The recovered solid can be disposed off or used in solution preparation and/or in solution resaturation, for use in an electrolysis process. This is particularly the case when the solid consists essentially of sodium chloride and is used for brine preparation and/or resaturation.

The recovered aqueous residue can be disposed off, send to a biological treatment, recycled to the treatment of step (b1), recycled to the treatment of the first variant and any combination of at least two of these operations.

In the second variant of the second embodiment, one usually obtains at least one evaporate and at least one evaporation residue.

The evaporate comprises water as the major component. The water content is usually higher than or equal to 900 g/kg, commonly higher than or equal to 950 g/kg, in many cases higher than or equal to 990 g/kg, often higher than or equal to 995 g/kg, frequently higher than or equal to 999 g/kg, specifically higher than or equal to 999.9 g/kg and in particular higher than or equal to 999.99 g/kg. That content is usually lower than or equal to 99.999 g/kg.

The evaporate may comprise a salt, often an inorganic salt. The salt content is usually lower than or equal to 1 g/kg, commonly lower than or equal to 0.5 g/kg, in many cases lower than or equal to 0.1 g/kg, often lower than or equal to 0.05 g/kg, frequently lower than or equal to 0.01 g/kg, specifically lower than or equal to 0.005 g/kg and in particular lower than or equal to 0.001 g/kg. That content is usually higher than or equal to 0.001 mg/kg.

The evaporate may comprise organic substances. These substances can be those already present in the aqueous composition to be treated, like as defined above, or organic substances formed during the reaction of step (a). The TOC of the evaporate is usually lower than or equal to 10 mg C/kg, preferably lower than or equal to 5 mg C/kg and more preferably lower than or equal to 2 mg C/kg. That TOC is usually higher than or equal to 0.1 mg C/kg.

The evaporate residue generally comprises at least one solid and at least one aqueous phase. This residue can be further submitted to a separation operation in order to recover at least one solid and at least one aqueous residue.

The separation operation and the characteristics of the recovered solid are as described hereabove for the first variant of the second embodiment except that the salt content of the solid is usually higher than or equal to 900 g/kg, commonly higher than or equal to 950 g/kg, in many cases higher than or equal to 980 g/kg, often higher than or equal to 990 g/kg, frequently higher than or equal to 999 g/kg, specifically higher than or equal to 999.5 g/kg and in particular higher than or equal to 999.9 g/kg.

The aqueous residue is usually more concentrated in organic substances than the aqueous composition submitted to the treatment of step (b1). These substances can be those already present in the aqueous composition to be treated, like as defined above or organic substances formed during the reaction of step (a). The TOC of the aqueous residue is usually higher than or equal to 50 mg C/kg, generally higher than or equal to 100 mg C/kg, in many cases higher than or equal to 200 mg C/kg, often higher than or equal to 400 mg C/kg and frequently higher than or equal to 600 mg C/kg.

That recovered aqueous residue can be disposed off, send to a biological treatment, recycled to the treatment of the second variant, recycled to the treatment of the first variant and any combination of at least two of these operations.

The recovered solid and/or the evaporate can be disposed off or used in solution preparation and/or in solution resaturation, for use in an electrolysis process. This is particularly the case when the solid consists essentially of sodium chloride and is used for brine preparation and/or saturation.

The use of the evaporate has the advantage of requiring no extra water which is especially important for processes, like electrolysis processes located in countries with limited water supply.

Further variants of the second embodiment can be obtained by combining in any way the treatments of the first and the second variants.

In a third embodiment, step (a) of the process according to the invention is carried out at a first pH value and the process for degrading organic substances in an aqueous composition comprises a further step (b2), wherein, at least part of the reaction medium of step (a) is subjected to an acidification operation in order to bring the pH at a second value lower than the pH value of step (a) and the organic substances are further oxidized.

Without willing to be bound by any theory, it is believed that the two step process of the third embodiment allows a high organic substances degradation level for the following reasons:
  At the higher pH of step (a), the oxidation of the organic substances proceed at a slower rate but the chlorination of the organic substances to give chlorinated organic substances highly resistant to oxidation is disfavored
  At the lower pH of step (b2), the oxidation of the remaining organic substances is more rapid and the chlorination of those remaining organic substances is reduced due to their lower concentration.

In other words, it is better to carry out step (b2) on an aqueous composition with a reduced Total Organic Content.

In that embodiment, the reaction of step (b2) is carried out at a pH controlled and maintained in a given range. The lowest limit of that pH range is generally higher than or equal to 0.01, preferably higher than or equal to 1, more preferably higher than or equal to 2 and most preferably higher than or equal to 3. The highest limit of that pH range is generally lower than 6, preferably lower than or equal to 5.5, more preferably lower than or equal to 5 and most preferably lower than or equal to 4. The pH has generally to be maintained at such set values since pH changes occur during the course of the oxidation reaction. The pH can be maintained at said values either by addition of an acidic compound or by addition of a basic compound. The acidic operation can be carried out by adding an acidic compound to the reaction medium from step (a), as the one described above.

In that embodiment, the temperature at which the reaction of step (b2) is carried out, is usually higher than or equal to 10° C., preferably higher than or equal to 30° C., more preferably higher than or equal to 60° C. and most preferably higher than or equal to 80° C. A temperature higher than or equal to 90° C. is convenient. A temperature higher than or equal to 100° C. suits well. That temperature is usually lower than or equal to 200° C., preferably lower than or equal to 180° C., more preferably lower than or equal to 160° C. and most preferably lower than or equal to 135° C. A temperature lower than or equal to 120° C. is convenient. A temperature lower than or equal to 110° C. suits well.

In the process according to the invention, the reaction of step (b2) is usually carried out under a pressure of 1 bar absolute, under a pressure above 1 bar absolute or under a pressure below 1 bar absolute. It is preferred to carry out the oxidation operation under a pressure that is regulated or set between 1 and 11 bar absolute, more preferably under a pressure of 1.1 to 7 bar and most preferably under a pressure of 1.1 to 4 bar.

In the process according to the invention, when step (b2) of the process is carried out in a discontinuous mode, the duration of the reaction of step (b2) is usually higher than or equal to 0.05 h, preferably higher than or equal to 0.1 h, more preferably higher than or equal to 0.2 h and most preferably higher than or equal to 0.5 h. That duration is usually lower than or equal to 8 h, preferably lower than or equal to 4 h, more preferably lower than or equal to 2 h and most preferably lower than or equal to 1 h. The duration is counted from the time of pH change of the reaction medium arising from step (a) to be treated.

In the process according to the invention, when step (b2) of the process is carried out in a continuous mode, the residence time of the reaction of step (b2) is usually higher than or equal to 0.05 h, preferably higher than or equal to 0.1 h, more preferably higher than or equal to 0.2 h and most preferably higher than or equal to 0.5 h. That residence time is usually lower than or equal to 8 h, preferably lower than or equal to 4 h, more preferably lower than or equal to 2 h and most preferably lower than or equal to 1 h. The residence time is defined by the ratio between the volume of the liquid reaction medium and the flow of the liquid reaction medium.

The reaction of step (b2) can be carried in one or more reaction zones, as described for the reaction of step (a).

In a first variant of the third embodiment, no additional compounds are added to step (b2) except the acidic compound if necessary to lower the pH, and the acidic or the basic compounds used if necessary to regulate the pH of step (b2). Without willing to be tied by any theory, it is believed that at such a pH, the chlorates ions and/or the active chlorine which are present in the reaction mixture at the end of step (a) are able to oxidize the remaining organic compounds, for instance carboxylic acids still present in the reaction medium after step (a) of the process.

The expression "active chlorine" is understood to mean molecular chlorine and its reaction products with water, chloride ions or with a basic agent, such as hypochlorous acid, trichloride ion and sodium hypochlorite for example. The content of active chlorine can be expressed in g of $Cl_2$/kg or mol of $Cl_2$/kg.

In a second variant of the third embodiment, at least one compound is added to step (b2) in addition to the acidic compound if necessary to lower the pH, and the acidic or the basic compounds used if necessary to regulate the pH of step (b2). That compound can be selected from the group consisting of chlorine, oxygenated chlorine compounds, and any mixture thereof. The oxygenated chlorine compound can be selected from the group consisting of hypochlorite, chlorate, chlorine dioxide, dichlorine monoxide, and any mixture thereof. The hypochlorite can be as described above. The chlorine can liquid or gaseous, preferably gaseous. It can be use pure or diluted by any inert gas like nitrogen, for instance. The chlorine dioxide is generally used as a gas. It can be produced in situ by addition of chlorine and chlorite ($ClO_2^-$).

In a first aspect of the first variant of that third embodiment, the pH is maintained at a value higher than or equal to 2 and lower than 6, preferably at a value higher than or equal to 3 and lower than or equal to 5.

In a second aspect of the first variant of that third embodiment, the pH is maintained at a value higher than or equal to 0.01 and lower than 3, preferably at a value higher than or equal to 0.01 and lower than 2.

In a first aspect of the second variant of that third embodiment, the additional compound is selected from the group consisting of chlorine, oxygenated chlorine compounds, and any mixture thereof, and the pH is maintained at a value higher than or equal to 2 and lower than 6, preferably at a value higher than or equal to 3 and lower than or equal to 5. Oxygenated chlorine compounds can be selected from the group consisting of hypochlorite, chlorate, chlorine dioxide, dichlorine monoxide, and any mixture thereof.

In a second aspect of the second variant of that third embodiment, the additional compound is selected from the group the group consisting of chlorine, oxygenated chlorine compounds, and any mixture thereof, and the pH is maintained at a value higher than or equal to 0.01 and lower than 3, preferably at a value higher than or equal to 0.01 and lower than 2. Oxygenated chlorine compounds can be selected from the group consisting of hypochlorite, chlorate, chlorine dioxide, dichlorine monoxide, and any mixture thereof.

In the first and third embodiments, the partial pressure of chlorine is generally higher than or equal to 0.001 bar, often higher than or equal to 0.01 bar, frequently higher than or equal to 0.1 bar and in particular higher than or equal to 0.5 bar. The partial pressure of chlorine is generally lower than or equal to 10 bar, often lower than or equal to 5 bar, frequently lower than or equal to 3 bar and in particular lower than or equal to 2 bar.

The partial pressure of chlorine is as defined above more particularly in the first and second aspects in the second variant of the third embodiment.

In a third variant of the third embodiment, during step (b2) a treatment with UV (Ultra Violet)-visible light is carried out on the reaction medium. That third variant will be referred hereafter as a chloro-photolysis treatment.

The wavelength of the UV-visible light used is generally higher than or equal to 100 nm, often higher than or equal to 150 nm and frequently higher than or equal to 200 nm. That wavelength is generally lower than or equal to 600 nm, often lower than or equal to 500 nm, frequently lower than or equal to 400 nm and in particular lower than or equal to 300 nm. The variation of the light intensity over the wavelength spectrum of the UV-visible light used can be continuous or discontinuous. UV-visible light with a discontinuous spectrum of wavelength is often used.

The UV-visible light used in that third aspect can be produced by any source, like UV-visible lamps for instance. Medium pressure UV lamps like High Tech DQ or QC from Heraeus-Noblelight are examples of such sources.

In that third variant the ratio between the electrical energy consumed by the source in Wh and the volume of the treated part of the reaction medium of step (a) in liter is usually higher than or equal to 1 Wh/l, often higher than or equal to 5 Wh/l, frequently higher than or equal to 10 Wh/l and particularly higher than or equal to 15 Wh/l. That ratio is usually lower than or equal to 100 Wh/l, often lower than or equal to 75 Wh/l, frequently lower than or equal to 50 Wh/l, and particularly lower than or equal to 40 Wh/l.

In that third variant, the concentration of "active chlorine" of the part of the reaction medium of step (a), preferably after acidification, is usually higher than or equal to 0.1 g of $Cl_2$/kg of the reaction medium of step (a), commonly higher than 0.2 g/kg and often higher than or equal to 0.3 g/kg. That concentration is usually lower than or equal to 100 g/kg, often lower than or equal to 10 g/kg, frequently lower than or equal to 1 g/kg, commonly lower than 0.8 g/kg and often lower than or equal to 0.5 g/kg.

In that third variant, the pH of step (b2), at which the chloro-photolysis treatment is carried out is generally maintained at a value higher than or equal to 1, usually higher than or equal to 2, preferably higher than or equal to 3 and more preferably higher than or equal to 4. That pH is usually maintained at a value lower than or equal to 6, preferably lower than or equal to 5 and more preferably lower than or equal to 4.5.

The chloro-photolysis treatment can be carried out in a discontinuous, continuous or semi-continuous mode. Those modes of operation are as defined above for the first embodiment.

The chloro-photolysis treatment can be carried out in one or more reaction zones. Those reaction zones are as defined above for the first embodiment.

In a fourth variant of the third embodiment, the chloro-photolysis treatment can also be carried out on the reaction medium after step (b2). This can be in a third step (c) consecutive to step (b2).

The chloro-photolysis treatment could also be carried out in place of step (a) or of step (b2). This embodiment would be useful when the content of the organic substances in the aqueous solution to be treated is low.

In these third and fourth variants, the conversion rate of the TOC content of the reaction medium after step (b2) is usually higher than or equal to 50%, often higher than or equal to 70%, frequently higher than or equal to 80% and in particular higher than or equal to 90%.

In these third and fourth variants, the TOC content of the reaction medium after step (b2) is usually lower than or equal to 30 mg C/l, preferably lower than or equal to 20 mg C/l, more preferably lower than or equal to 15 mg C/l and most preferably lower than or equal to 10 mg C/l. That TOC is usually higher than or equal to 0.1 mg C/kg.

In these third and fourth variants, the COD content of the reaction medium after step (b2) is usually lower than or equal to 250 mg O/kg, preferably lower than or equal to 150 mg O/kg and more preferably lower than or equal to 50 mg O/kg. That COD is usually higher than or equal to 1 mg O/kg.

In a fifth variant of that third embodiment, at least one additional compound selected the group consisting of chlorine, oxygenated chlorine compounds, and any mixture thereof is added to step (b2) and a treatment with UV-visible light is carried out during step (b2). The oxygenated chlorine compound can be selected from the group consisting of hypochlorite, chlorate, chlorine dioxide, dichlorine monoxide, and any mixture thereof.

The treatment with UV-visible light is as described for the third and fourth variants.

In that fifth variant, the concentration of "active chlorine" of the part of the reaction medium of step (a), preferably after acidification and after the additional compound addition, is usually higher than or equal to 0.1 g of $Cl_2$/kg of aqueous composition, commonly higher than 0.2 g/kg and often higher than or equal to 0.3 g/kg. That concentration is generally lower than or equal to 100 g/kg, often lower than or equal to 10 g/kg, frequently lower than or equal to 1 g/kg of aqueous composition, commonly lower than 0.8 g/kg and often lower than or equal to 0.5 g/kg.

In a sixth variant of that third embodiment, at least one additional compound selected the group consisting of chlorine, oxygenated chlorine compounds, and any mixture thereof is added to step (b2) and a treatment with UV-visible light is carried out after step (b2). The oxygenated chlorine compound can be selected from the group consisting of hypochlorite, chlorate, chlorine dioxide, dichlorine monoxide, and any mixture thereof. This can be in a third step (c) consecutive to step (b2).

The chloro-photolysis treatment could also be carried out in place of step (a) or of step (b2). This would however be useful when the content of the organic substances in the aqueous solution to be treated is low.

In a seventh variant of the third embodiment, during step (b2), a treatment by electrolysis is carried out on the reaction medium. This treatment will be referred hereafter as an electrolysis treatment.

The electrolysis treatment generally comprises passing a direct current through the reaction medium of step (b2) or applying a direct voltage across the reaction medium of step (b2). This treatment preferably comprises passing a direct current through the reaction medium of step (b2).

In the electrolysis treatment of the seventh variant, the temperature is often lower than or equal to 120° C., frequently lower than or equal to 100° C. and particularly lower than or equal to 90° C. That temperature is usually higher than or equal to 0° C., often higher than or equal to 25° C., frequently higher than or equal to 50° C., particularly higher than or equal to 60° C. and specifically higher than or equal to 70° C. A temperature of 85° C. is particularly convenient.

In the electrolysis treatment of the seventh variant, the pressure is often lower than or equal to 5 bar absolute, frequently lower than or equal to 2 bar, particularly lower than or equal to 1.8 bar and specifically lower than or equal to 1.5 bar. That pressure is usually higher than or equal to 0.01 bar absolute, often higher than or equal to 0.1 bar, frequently higher than or equal to 0.5 bar, particularly higher than or equal to 0.6 bar and specifically higher than or equal to 0.7 bar.

In the electrolysis treatment of the seventh variant, the pH of the part of the reaction medium of step (a), is generally maintained at a value higher than or equal to 2, often higher than or equal to 3 and frequently higher than or equal to 3.5. That pH is generally maintained at a value lower than or equal to 6, often lower than or equal to 5 and frequently lower than or equal to 4.5.

That pH can be adjusted before or during the electrolysis treatment, by adding an acidic or a basic compound.

The electrolysis treatment can be carried out in a discontinuous, continuous or semi-continuous mode. Those modes of operation are as defined above for the first embodiment.

The electrolysis treatment can be carried out in one or more reaction zones. Those reaction zones are as defined above for the first embodiment.

In that seventh variant, when the electrolysis process is carried out in the discontinuous mode, the reaction time is generally lower than or equal to 10 h, often lower than or equal to 5 h, frequently lower than or equal to 2 h, particularly lower than or equal to 1 h and specifically lower than or equal to 0.5 h. That time is usually higher than or equal to 0.005 h, often higher than or equal to 0.05 h, frequently higher than or equal to 0.1 h, particularly higher than or equal to 0.15 h and specifically higher than or equal to 0.2 h.

In that seventh variant, when the electrolysis treatment is carried out in the continuous mode, the residence time is generally lower than or equal to 10 h, often lower than or equal to 5 h, frequently lower than or equal to 2 h, particularly lower than or equal to 1 h and specifically lower than or equal to 0.5 h. That residence time is usually higher than or equal to 0.005 h, often higher than or equal to 0.5 h, frequently higher than or equal to 0.1 h, particularly higher than or equal to 0.15 h and specifically higher than or equal to 0.2 h. The residence time is defined as the ratio between the volume of the zone where the electrolysis treatment is carried out and the flow rate of the reaction medium fed to that zone.

The electrolysis process of the seventh variant is usually carried out in an electrolysis cell (or unit) comprising at least one anode and at least one cathode.

In the electrolysis treatment of the seventh variant, when the treatment is carried out under the direct current mode, the current density passed through the reaction medium is generally higher than or equal to 1 A/m$^2$ of electrode, preferably of anode, often higher than or equal to 100 A/m$^2$, frequently higher than or equal to 1000 A/m$^2$ and specifically higher than or equal to 5000 A/m$^2$. That current density is generally lower than or equal to 25000 A/m$^2$ of electrode, preferably of anode, often lower than or equal to 20000 A/m$^2$, frequently lower than or equal to 15000 A/m$^2$ and specifically lower than or equal to 10000 A/m$^2$.

In the electrolysis treatment of the seventh variant, when the electrolysis is carried out under the direct voltage mode, the voltage applied between the anode and the cathode is generally higher than or equal to 2.3 V, often higher than or equal to 2.4 V and frequently higher than or equal to 2.5 V. That voltage is generally lower than or equal to 6 V, often lower than or equal to 5 V and frequently lower than or equal to 4 V.

The electrolysis treatment of the seventh variant generally comprises applying a direct current or applying a direct voltage between the cathode and the anode, often comprises applying a direct current between the cathode and the anode.

The electrolysis cell can be a divided cell or an undivided cell. A divided cell is a cell where the anode and the cathode are separated, like in a mercury cell, a diaphragm cell, a membrane cell or a cell where the anodic compartment and cathodic compartments are linked by an electrolytic bridge. The electrolysis cell is often a divided cell. It is often a diaphragm cell or a membrane cell, and frequently a membrane cell. A mercury cell is also convenient. The advantage of using a divided cell is to avoid the contact between the products formed at the anode and the products formed at the cathode.

When the electrolysis cell is a diaphragm or a membrane cell, it generally comprises an anolyte compartment containing at least one anode and a catholyte compartment containing at least one cathode, the compartments being separated by a least one diaphragm or at least one membrane. The part of the reaction medium of step (a) to be submitted to the electrolysis treatment can be fed to the anolyte compartment, to the catholyte compartment or to both compartments of the electrolysis cell. It is preferably fed to the anolyte compartment.

The ratio between the surface of the electrode, preferably the anode, and the volume of the reaction medium of step (b2) is usually higher than or equal to 0.001 cm$^{-1}$, often higher than or equal to 0.005 cm$^{-1}$, frequently higher than or equal to 0.01 cm$^{-1}$, in many cases higher than or equal to 0.1 cm$^{-1}$, and in particular higher than or equal to 0.2 cm$^{-1}$. That surface to volume ratio is usually lower than or equal to 1 cm$^{-1}$, often lower than or equal to 0.5 cm$^{-1}$, frequently lower than or equal to 0.4 cm$^{-1}$ and in particular higher than or equal to 0.3 cm$^{-1}$. When an undivided electrolysis cell is used, the volume of the reaction medium of step (b2) is the volume of that medium in the electrolysis cell. When a divided electrolysis cell is used, the volume of the reaction medium of step (b2) is the volume of that medium in the anodic compartment or in the cathodic compartment of the electrolysis cell, preferably in the anodic compartment.

The characteristics of the various type of electrolysis cells, of the anodes and cathodes, of the membranes and diaphragms, etc. can be found in Ullmann's Encyclopedia of Industrial Chemistry, Fifth Completely Revised Edition, Vol. A6 1986, pp. 401-477.

In the seventh variant of the third embodiment, the conversion rate of the TOC content of the reaction medium after step (b2) is usually higher than or equal to 25%, often higher than or equal to 30%, frequently higher than or equal to 50% and in particular higher than or equal to 70%.

In an eight variant of the third embodiment, the electrolysis treatment can also be carried out on the reaction medium after step (b2). This can be in a third step (c''') consecutive to step (b2).

In a ninth variant of the third embodiment, at least one additional compound selected from the group consisting of chlorine, oxygenated chlorine compounds, and any mixture thereof is added to step (b2) and during step (b2) and a treatment by electrolysis is carried out. The oxygenated chlorine compound can be selected from the group consisting of hypochlorite, chlorate, chlorine dioxide, dichlorine monoxide, and any mixture thereof.

In a tenth variant of the third embodiment, at least one additional compound selected from the group consisting of chlorine, oxygenated chlorine compounds, and any mixture thereof is added to step (b2) and after step (b2) and a treatment by electrolysis is carried out. The oxygenated chlorine compound can be selected from the group consisting of hypochlorite, chlorate, chlorine dioxide, dichlorine monoxide, and any mixture thereof.

The treatment by electrolysis of the ninth and tenth variants are as described in the seventh variant of the third embodiment.

The electrolysis treatment could also be carried out in place of step (a) or of step (b2). This embodiment would be useful when the content of the organic substances in the aqueous solution to be treated is low.

In an eleventh variant of the third embodiment, during step (b2), a treatment with UV-visible light and an electrolysis treatment are carried out.

In a twelfth variant of the third embodiment, after step (b2), a treatment with UV-visible light and an electrolysis treatment are carried out.

In a first aspect of this twelfth variant, the two treatments are carried out simultaneously, after step (b2).

In a second aspect of this twelfth variant, the two treatments are carried out sequentially, after step (b2). Any sequence is convenient.

In a thirteenth variant of the third embodiment, during step (b2), a treatment with UV-visible light is carried out and, after step (b2) an electrolysis treatment is carried out.

In a fourteenth variant of the third embodiment, during step (b2), an electrolysis treatment is carried out and after step (b2), a treatment with UV-visible light is carried out.

In further fifteenth to eighteenth variants, of the third embodiment, at least one additional compound selected from the group consisting of chlorine, oxygenated chlorine compounds, and any mixture thereof is added to step (b2) and the UV and electrolysis treatments of the variants 11 to 14 are carried out. The oxygenated chlorine compound can be selected from the group consisting of hypochlorite, chlorate, chlorine dioxide, dichlorine monoxide, and any mixture thereof.

The UV-visible and electrolysis treatments of those eleventh to fourteenth variants are as described above, respectively for the third and seventh variants.

In a nineteenth variant of the third embodiment, at least one part of the reaction medium of step (b2) is subjected to an operation selected from the group consisting of cooling, evaporative crystallization, and any combination thereof, in order to recover at least one salt that might be present in the reaction medium of step (b2) and at least one aqueous composition. In that variant, step (b1) is carried out on the reaction medium obtained at the end of step (b2).

In the process according to the invention, usually, at least one of the steps (a), (b1) and (b2) is carried out in a continuous mode. Preferably, all of the steps (a), (b1) and (b2) are carried out in a continuous mode.

The various variants of the second embodiment of the process according to the invention can be envisioned as various aspects of the nineteenth variant of the third embodiment of the process according to the invention.

Any combination between at least two variants of the third embodiment can be envisioned.

In the process for degrading the organic substances of the aqueous composition according to the invention the various steps are preferably carried out in equipment produced from or covered with materials that are resistant to the treatment conditions. Those materials are such as described in the International application WO 2008/152043 of SOLVAY SA, the content of which is incorporated herein by reference, more specifically the passage from page 29, line 20 to page 30, line 20.

The reaction medium obtained after the treatments of the first and third embodiments, the salt recovered in the second embodiment and the solution obtained by combining the salt and the evaporate recovered in the second variant of the second embodiment can be used as a starting material in an electrolysis process, preferably in an electrolysis process for producing chlorine, preferably an electrolysis process for industrially producing chlorine, and more preferably for an electrolysis process for industrially producing chlorine from brine, as disclosed in the International application WO 2008/152043 of SOLVAY SA, the content of which is incorporated herein by reference, more specifically the passage from page 31, line 2 to page 35, line 2. The reaction medium can be submitted to classical treatment before being used in such electrolysis processes like for instance dechlorination, NaCl saturation or ion-exchange resin treatments.

The transfer of the reaction medium obtained after the treatments of the first and third embodiments and of the solution obtained in the second variant of the second embodiment to the electrolysis process is usually carried in equipment produced from or covered with materials that do not release components which could be detrimental to the electrolysis process.

By way of suitable material, mention may be made, for example, of enameled steel, polymers like, polyolefins such as polypropylene and polyethylene, chlorinated polymers such as polyvinyl chloride and chlorinated polyvinyl chloride, fluorinated polymers such as totally fluorinated polymers like, polytetrafluoroethylene, copolymers of tetrafluoroethylene and hexafluoropropylene, and poly(perfluoropropylvinylether), such as partially fluorinated polymers like poly(vinylidene fluoride), copolymers of ethylene and chlorotrifluoroethylene, polymers comprising sulphur, such as polysulphones or polysulphides, in particular aromatic, coatings by means of resins among which, epoxy resins or phenolic resins, metals such as tantalum, titanium, copper, gold and silver, nickel and molybdenum, or alloys thereof, more particularly alloys containing nickel and molybdenum.

Polyolefins, in particular polypropylene are particularly convenient when the reaction medium does not contain any remaining "active chlorine", i.e., the "active chlorine" content is lower than or equal to 1 mg of $Cl_2$/kg, preferably lower than or equal to 0.5 mg of $Cl_2$/kg and more preferably lower than or equal to 0.1 mg of $Cl_2$/kg.

When the reaction medium still contains remaining "active chlorine", i.e., the "active chlorine" content is higher than 1 mg of $Cl_2$/kg, preferably higher than or equal to 10 mg of $Cl_2$/kg and more preferably higher than or equal to 100 mg of $Cl_2$/kg, it is preferred to use chlorinated polymers, fluorinated polymers, metals or alloys.

Polyvinyl chloride, polyvinylidene fluoride, and copolymers of ethylene and chlorotrifluoroethylene are particularly suitable when the pH of the reaction medium or of the solution is lower than or equal to 5, preferably lower than or equal to 4 and more preferably lower than or equal to 3.

Perfluorinated polymers such as polytetrafluoroethylene, copolymers of tetrafluorethylene and hexafluoropropylene, and poly(perfluoropropylvinylether) can be used in the presence of active chlorine at any pH but they are particularly convenient when the pH of the reaction medium or of the solution is higher than 5, preferably higher than or equal to 7 and more preferably higher than or equal to 9.

Metals like tantalum and titanium, alloys like Hastelloy C, and enameled steel can be used in the presence of active chlorine at any pH but they are particularly convenient when the pH of the reaction medium or of the solution is higher than 5, preferably higher than or equal to 7 and more preferably higher than or equal to 9.

In the variants of the third embodiment where an electrolysis treatment is carried out, the electrolysis treatment can be carried out in an electrolysis cell for producing chlorine. This has the advantage of combining the production of chlorine and the degradation of the organic compounds present in the aqueous composition to be treated. The degradation of the organic compounds during the electrolysis for producing chlorine has the following advantages. Firstly, it can reduce the TOC in the depleted brine to be recycled to the electrolysis cell. Secondly, it can concomitantly reduce the frequency of the purge of the recycled brine and the TOC of that purge. These advantages leads to a reduction in the number process steps, with a favorable economic impact.

EXAMPLE 1

A glass thermostated jacketed reactor having a working volume of 1 l and fitted with a vertical condenser has been supplied with 269 g of a brine containing per kg, 4.76 g of 3-chloropropane-1,2-diol, 5.03 g of 1,3-dichloro-2-propanol, 2.39 g of 2,3-dichloro-1-propanol, 0.17 g of glycerol (1,2,3-propanetriol), 217 g of sodium chloride, the balance being water. The TOC of that brine was 4.2 g C/l and the calculated COD was 11.5 g O/kg. That brine has been heated at reflux (~107° C.) under atmospheric pressure (~1013 mbar absolute) and under stirring (magnetic bar). To the heated brine, a first fraction (63.2 g) of an aqueous hypochlorite solution containing per kg, 1.532 mol of sodium hypochlorite (NaOCl), 0.006 mol of sodium chlorate ($NaClO_3$), 0.100 mol of sodium hydroxide, 1.54 mol of sodium chloride, the balance being demineralized water has been added at once (time zero). A second, a third and a fourth fraction (respectively of 62.7 g, 63.8 g and 63.5 g) have been added, each at once, after respectively 15, 30 and 45 minutes.

The pH of the resulting mixtures has been maintained at a value of 8 (+/−0.1) at 106° C. (8.5+/−0.1 at 25° C.) by regular addition of a sodium hydroxide solution (1 M) during the first 20 minutes (45 ml of NaOH 1 M added), and by regular addition of a hydrogen chloride solution (1 M) after the first 20 minutes. After 45 min, samples have been regularly withdrawn from the reaction mixture for analysis.

The samples have been analyzed by iodometry ($ClO^-$ and $ClO_3^-$) and mercurimetry ($Cl^-$). The samples have been treated with an excess of sodium sulfite and then analyzed for their TOC content according to the methods mentioned above.

The results have been summarized in Table 1.

TABLE 1

| Ex. | ClO—/COD ($gCl_2/gCl_2$) | Time (min) | pH | $ClO_3$— (mmol/kg) | TOC (mgC/l) | TOC conv (%) |
|---|---|---|---|---|---|---|
| 1 | 2.0 | 45 | 8.43 | 49 | 63 | 97.1 |
|   |     | 75 | 8.00 | 88 | 18 | 99.2 |
|   |     | 105 | 8.00 | 90 | 12 | 99.4 |
|   |     | 135 | 8.00 | 90 | 11 | 99.5 |
|   |     | 165 | 7.99 | 92 | 11 | 99.5 |
|   |     | 285 | 7.97 | 83 | 11 | 99.5 |

The quantity of ClO⁻ and the COD have been expressed in g $Cl_2$ according to the following rules: 1 g ClO⁻ corresponds to 1.38 g $Cl_2$, and 1 g O corresponds to 4.43 g of $Cl_2$.

EXAMPLES 2 AND 3

The procedure of example 1 has been followed except that the amount of the hypochlorite added and the pH have been modified as described in Table 2.

TABLE 2

| Ex. | ClO—/COD ($gCl_2/gCl_2$) | Time (min) | pH | $ClO_3$— (mmol/kg) | TOC (mgC/l) | TOC conv (%) |
|---|---|---|---|---|---|---|
| 1 | 2.0 | 165 | 7.99 | 92 | 11 | 99.5 |
| 2 | 2.0 | 165 | 8.1 | 101.5 | 7 | 99.7 |
| 3 | 1.57 | 165 | 7.99 | 48.8 | 15 | 99.4 |

EXAMPLES 4 TO 7

The procedure of example 1 has been followed except that the brine to be treated did not contain any monochloropropanediol, that the amount of the hypochlorite added and the pH have been modified as described in Table 3, where the results have also been summarized.

TABLE 3

| Ex. | ClO—/COD ($gCl_2/gCl_2$) | Time (min) | pH | $ClO_3$— (mmol/kg) | TOC (mgC/l) | TOC conv (%) |
|---|---|---|---|---|---|---|
| 4 | 2.7 | 165 | 9.30 | 13 | 16 | 95.9 |
| 5 | 2.8 | 165 | 8.1 | 27.7 | <5 | >97 |
| 6 | 2.0 | 165 | 12.2 | 6.9 | 120 | 69.6 |
| 7 | 2.0 | 165 | 8.8 | 13 | <5 | >97 |

EXAMPLE 8

A first glass thermostated jacketed reactor (R1) having a working volume of 400 ml, fitted with a vertical refrigerant and a magnetic bar, has been supplied continuously with:
  a brine containing per kg, 1.989 g of ethylene glycol, 3.580 g of formic acid, 16.53 g of sodium chloride, the balance being water. The calculated TOC of that brine was 1.70 g C/l and the calculated COD was 3.81 g O/kg (16.91 g $Cl_2$/kg).
  a first stream of an aqueous hypochlorite solution containing per kg, 1.550 mol of sodium hypochlorite (NaOCl, 109.92 g $Cl_2$/kg)), 0.0123 mol of sodium chlorate (Na$ClO_3$), 0.133 mol of sodium hydroxide, 1.708 mol of sodium chloride, the balance being demineralized water.

A second glass thermostated jacketed reactor (R2) having a working volume of 400 ml, fitted with a vertical refrigerant and a magnetic bar, has been supplied continuously with:
  the liquid mixture exiting the first reactor by continuous overflow
  a second stream of the aqueous hypochlorite solution.

A third glass thermostated jacketed reactor (R3) having a working volume of 307 ml and fitted with a vertical refrigerant has been supplied continuously with:
  the liquid mixture exiting the second reactor by continuous overflow.

The reaction medium in the first and second reactor have been heated at reflux (~105° C.) under atmospheric pressure (~1013 mbar absolute) and under stirring (magnetic bar). The reaction medium in the third reactor has been heated to a temperature just below its boiling point under atmospheric pressure with no stirring. The first two reactor simulate perfectly stirred tanks reactors while the third one simulate a plug-flow reactor.

The pH of the reaction medium in the first two reactors is regulated by addition of a 37% hydrogen chloride aqueous solution.

The top of the vertical refrigerants has continuously been flushed with nitrogen, and the flushed gas has been trapped in a scrubber containing an aqueous solution of NaOH 3M.

The samples have been analyzed by iodometry (ClO⁻ and $ClO_3^-$) and mercurimetry (Cl⁻). The samples have been treated with an excess of sodium sulfite and then analyzed for their TOC content according to the methods mentioned above. Carboxylic acids have been measured by ionic chromatography and aldehydes have been measured by high performance liquid chromatography (HPLC) after derivatization into hydrazone. The flushed gas have been analyzed by gas chromatography and the scrubber content has been analyzed for hypochlorite by iodometry and for weak bases by acidimetry.

The results have been summarized in Table 4.

EXAMPLES 9 AND 10

The procedure of example 8 has been followed except that the hypochlorite solution contained per kg, 1.327 mol of sodium hypochlorite (NaOCl, 94.10 g $Cl_2$/kg)), 0.0037 mol of sodium chlorate (Na$ClO_3$), 0.58 mol of sodium hydroxide, 1.914 mol of sodium chloride, the balance being demineralized water.

The results have been summarized in Table 4.

TABLE 4

| Ex. | Brine) (ml/h) (R1) | ClO⁻ (ml/h) (R1) | ClO⁻ (ml/h) (R2) | Residence time (min) | | | pH (25° C.) | | | $ClO_3^-$ (mmol/kg) | TOC (mgC/l) | TOC Conv (%) |
|---|---|---|---|---|---|---|---|---|---|---|---|---|
|   |      |     |     | (R1) | (R2) | (R3) | (R1) | (R2) | (R3) |      |     |      |
| 8 | 1080 | 182 | 91  | 16.4 | 14.7 | 12.5 | 6.2 | 6.1 | 6.1 | 40.2 | 8   | 99.4 |
| 9 | 1080 | 212 | 106 | 16.9 | 14.9 | 12.6 | 8.9 | 9.5 | 9.0 | 7.8  | 210 | 83.5 |
| 10| 1080 | 212 | 106 | 16.5 | 13.8 | 11.7 | 8.5 | 8.8 | 8.3 | 29   | 110 | 90.7 |

EXAMPLE 11

The treatment has been carried out in a glass thermostated reactor equipped with a magnetic stirring bar coated with polytetrafluoroethylene, a thermocouple sensor in a glass jacket, a pH electrode, a tube for chlorine gas addition and a vertical condenser connected to a scrubber.

581.6 g of a 20% by weight NaCl aqueous solution containing 989 mg/l of acetic acid and 493 mg/l of propionic acid have been added to the reactor. The TOC content was 635 mg C/l. This solution simulates a reaction medium obtained after the treatment of step (a) according to the first embodiment of the invention.

A continuous injection of chlorine gas in the solution has been carried out at 80° C., in order to maintain the gas saturation of the solution. The total pressure was of 1 bar. The chlorine partial pressure has been estimated to 0.6 bar as the water vapor pressure above the solution is 0.4 bar at 80° C. The pH value of the solution saturated with chlorine (measured at room temperature) has been adjusted and maintained between 3.95 and 4.56 by addition of pellets of caustic soda in the saturated solution during the introduction of chlorine. The results of the treatment are summarized in Table 5. The time zero has been taken as the time of starting the injection of chlorine in the solution.

TABLE 5

| Time (min) | TOC (mgC/l) | Acetic acid (mg/1) | Propionic acid (mg/l) | Bromide (mg/l) | Chlorate (mg/l) | Total caustic soda added (mg) |
|---|---|---|---|---|---|---|
| 15 | 617 | 940 | 410 | 6.3 | 29 | 694 |
| 30 | 605 | 870 | 380 | 7.1 | 18 | 1082 |
| 45 | 582 | 840 | 350 | 13 | 43 | 1082 |
| 60 | 560 | 810 | 310 | 15 | 52 | 1322 |
| 90 | 522 | 750 | 260 | 15 | 85 | 1322 |
| 120 | 482 | 690 | 210 | 17 | 120 | 1322 |

EXAMPLE 12

The equipment and the procedure of example 11 have been used.

603.7 g of a 20% by weight NaCl aqueous solution containing 1021 mg/l of acetic acid and 509 mg/l of propionic acid have been used. The TOC content was 656 mg C/l. This solution simulates a reaction medium obtained after the treatment of step (a) according to the first embodiment of the invention.

The temperature of the treatment was 100° C. and the total pressure was 1 bar. The chlorine partial pressure has been estimated to 0.15 bar as the water vapor pressure above the solution is 0.85 bar at this temperature. The pH has been adjusted and maintained between 3.8 and 4.5 by addition of pellets of caustic soda in the saturated solution during the injection of chlorine. The results are summarized in Table 6. The time zero has been taken as the time of starting the injection of chlorine in the solution.

TABLE 6

| Time (min) | TOC (mgC/l) | Acetic acid (mg/l) | Propionic acid (mg/l) | Chlorate (mg/l) | Total caustic soda added (mg) |
|---|---|---|---|---|---|
| 15 | 654 | 990 | 430 | <1 | 251 |
| 30 | 602 | 900 | 340 | 11 | 412 |
| 45 | 526 | 780 | 260 | 14 | 412 |
| 60 | 479 | 710 | 190 | 17 | 651 |

EXAMPLE 13

The procedure of example 8 has been followed.

The brine engaged in the treatment contained per kg, 0.69 g of glycerol, 0.59 g of 1-chloro-2,3-propanediol, 0.08 g of 2-chloro-1,3-propanediol, 0.39 g of epichlorohydrin, 0.08 g of hydroxyacetone, 0.073 g of acetic acid, 0.050 g of formic acid, 0.018 g of lactic acid, 0.012 g of propionic acid and 16.53 g of sodium chloride. The sodium chloride content of the brine was 176 g/l and the balance was water. The measured TOC of that brine was 1.4 g C/l and the measured COD was 3.9 g O/l.

The hypochlorite solution contained per kg, 1.39 mol of sodium hypochlorite (NaOCl, 98.7 g $Cl_2$/kg)), 0.010 mol of sodium chlorate ($NaClO_3$), 0.55 mol of sodium hydroxide, 1.45 mol of sodium chloride, the balance being demineralized water.

The pH of the reaction medium in the first two reactors has been regulated by addition of a 6% hydrogen chloride aqueous solution.

A brine with a TOC value of 0.085 g C/l has been recovered at the output of the third reactor. That brine contained per kg, 2.65 mol of NaCl, 0.016 mol of sodium hypochlorite, 0.033 mol of sodium chlorate, 0.12 g of acetic acid, 0.012 g of propionic acid, 0.008 g of formic acid, 0.005 g of lactic acid, 0.006 g of succinic acid and 0.003 g of adipic acid.

A sample of 1873 g of this brine has been transferred in a thermostated glass reactor equipped with a magnetic stirring rod covered with polytetrafluoroethylene, a pH electrode, a thermocouple sensor in a glass jacket, a medium UV lamp in a quartz jacket and a vertical condenser connected to a scrubber. The UV lamp was a HERAEUS UV immersion lamp TQ150 with an input rating of 150 W. The brine has been heated at 80° C. under stirring and the pH has been adjusted at 4.4 by addition of 55 ml of HCl 6N. The irradiation has then been started. The TOC value has decreased to 0.013 g/l and 0.009 g/l after respectively 20 min and 35 min of irradiation time. The brine contained finally per kg, 0.008 g of acetic acid, 0.006 g of lactic acid and 0.003 g of formic acid.

EXAMPLE 14

A glass reactor of 5 l fitted with a magnetic bar for stirring, a Medium pressure High Tech QC lamp from Heraeus-Noblelight with an input rating of 150 W in a centrally positioned quartz jacket, a vertical condenser connected to a scrubber, means for introducing liquids and an overflow system has been used.

The reactor has been fed with an aqueous solution containing 0.74 g/kg of active chlorine, 3.06 g/kg of sodium chlorate, 170 g/kg of sodium chloride, 0.162 g/l of acetic acid, 0.020 g/l of glycolic acid, 0.018 g/l of formic acid, 0.015 g/l of lactic acid and 0.005 g/l of propionic acid (TOC content of 0.092 g C/l) at a rate of 5 l/h and with an aqueous solution of sodium hypochlorite at the concentration of 2.03 mol/kg at a rate of 50 ml/h.

The aqueous solution was a reaction medium obtained after the treatment of step (a) according to the first embodiment of the invention.

The pH has been regulated at 4.2 with the addition of HCl 37% by weight. The temperature has been set between 80 and 85° C. The total pressure was 1 bar. The residence time of the liquid in the reactor was 60 min. The lamp has been operated at an energy dissipation of 30 Wh/l. The brine collected at the output of the photoreactor contained 0.05 g/kg of active chlorine, 4.35 g/kg of sodium chlorate, 0.009 g/l of acetic acid and 0.001 g/l of formic acid. The TOC content was 0.015 g C/l.

EXAMPLE 15

The conditions of example 14 have been used excepted that the brine flow rate has been increased to 10 l/h, so that the energy dissipation of the lamp has been of 15 Wh/l. The brine before the treatment contained 3.36 g/kg of active chlorine, 3.86 g/kg of sodium chlorate, 170 g/kg of sodium chloride, 0.145 g/l of acetic acid, 0.023 g/l of glycolic acid and 0.035 g/l of formic acid (TOC content of 0.066 g C/l). No additional active chlorine has been added to the reactor and the pH has been regulated at 4.2 with the addition of HCl 37% by weight. The temperature has been set at 95° C. The residence time of the liquid in the reactor was 30 min. The brine collected at the output of the reactor contained 0.55 g/kg of active chlorine, 4.3 g/kg of sodium chlorate, 0.042 g/l of acetic acid. The TOC content was 0.024 g C/l.

EXAMPLE 16

An undivided electrolysis cell of 1 liter, comprising an anode and a cathode and a stirring device has been used. The anode consisted of a Titanium substrate on which an electrochemical coating has been applied. The test has been carried out under discontinuous mode. The cell has been filled with an aqueous composition comprising per kg of composition, 163 g of sodium chloride, and per liter of composition 135 mg of acetic acid, 46 mg of glycolic acid and 2 mg of formic acid, and a TOC of 130 mg of C/l.

The aqueous solution was a reaction medium obtained after the treatment of step (a) according to the first embodiment of the invention.

A direct current density of 1 kA per m$^2$ has been applied at the anode. The temperature of cell has been maintained at 75° C. and at a total pressure at 1 bar absolute. The ratio between the anode surface and the volume of the aqueous composition was 0.01 cm$^{-1}$. The pH has been kept at 4.5 during the electrolysis.

The TOC conversion has been recorded as a function of the electrical charge passed. The results are presented in Table 7.

EXAMPLE 17

The conditions of example 16 have been used except that the ratio between the anode surface and the volume of the aqueous composition was 0.28 cm$^{-1}$. The results are presented in Table 7.

EXAMPLE 18

The conditions of example 16 have been used except that the direct current density was 0.1 kA/m$^2$. The results are presented in Table 7.

TABLE 7

| Charge | TOC conversion (%) | | |
|---|---|---|---|
| (Ah/m$^2$) | Example 16 | Example 17 | Example 18 |
| 50 | n.m. | 27 | 49 |
| 83 | 35 | n.m. | n.m. |
| 100 | n.m. | 43 | 54 |
| 167 | 45 | n.m. | n.m. |
| 333 | n.m. | 50 | n.m. |
| 500 | 53 | n.m. | n.m. |
| 1000 | 78 | 68 | n.m. | n.m.: not measured

EXAMPLE 19

The conditions of example 16 have been used except that the ratio between the anode surface and the volume of the aqueous composition was 0.28 cm$^{-1}$. The acetic acid conversion has been recorded as a function of the electrical charge passed. The results are presented in Table 8.

EXAMPLE 20

The conditions of example 19 have been used except that direct current density of 0.5 kA per m$^2$ of electrode. The results are presented in Table 8.

EXAMPLE 21

The conditions of example 19 have been used except that the direct current density was 0.1 kA/m$^2$. The results are presented in Table 8.

TABLE 8

| Charge | Acetic acid conversion (%) | | |
|---|---|---|---|
| (Ah/m$^2$) | Example 19 | Example 20 | Example 21 |
| 50 | 1 | 2 | 8 |
| 100 | 2 | n.m. | 12 |
| 333 | 11 | 6 | n.m. |
| 1000 | 11 | n.m. | n.m. | n.m.: not measured

EXAMPLE 22

An electrolysis cell of 0.6 liter, comprising an anolyte compartment with one anode and a catholyte compartment with one cathode, separated by a membrane, has been used. The anode consisted of a Titanium substrate on which an electrochemical coating has been applied. The cathode consisted of a nickel substrate on which an electrochemical coating has been applied. The membrane was an Asahi Glass Company—Flemion F8020 membrane. The NaOH concentration in the catholyte compartment has been set to 32% by weight of NaOH by continuously feeding the catholyte compartment with an aqueous composition containing 29% by weight of NaOH. The NaCl concentration in the anolyte compartment has been set to 19% by weight by continuously feeding the anolyte compartment with an aqueous composition comprising per kg of composition, 250 g of sodium chloride, and per liter of composition 120 mg of acetic acid, 21 mg of dichloracetic acid, 20 mg of glycerol, 1.5 mg of succinic acid, 1.5 mg of oxalic acid, 1 mg of glyceraldehyde, 0.5 mg of formaldehyde, and a TOC of 70 mg of C/l.

The aqueous solution was a reaction medium obtained after the treatment of step (a) according to the first embodiment of the invention. The solution has been submitted to typical dechlorination, NaCl saturation and ion-exchange resin treatments before being fed to the cell.

A direct current density of 4 kA per m² of electrode has been applied between the anode and the cathode. The temperature of cell has been maintained at 85° C. and at a total pressure at 1 bar absolute.

The TOC value in the brine at the outlet of the anolyte compartment of the cell was 58 mg of C/l.

The TOC conversion in the brine at the outlet of the anolyte compartment of the cell was 34%.

EXAMPLE 23

The conditions of example 22 have been used except that the anolyte compartment has been fed with an aqueous composition comprising per kg of composition, 250 g of sodium chloride, and per liter of composition 130 mg of acetic acid, 32 mg of dichloracetic acid, 22 mg of glycerol, 12 mg of propionic acid, 3.1 mg of succinic acid, 2.7 mg of oxalic acid, 0.3 mg of glyceraldehyde, 0.6 mg of formaldehyde, and a TOC of 85 mg of C/l.

The aqueous solution was a reaction medium obtained after the treatment of step (a) according to the first embodiment of the invention. The solution has been submitted to typical dechlorination, NaCl saturation and ion-exchange resin treatments before being fed to the cell.

The TOC value in the brine at the outlet of the anolyte compartment of the cell was 75 mg of C/l.

The TOC conversion in the brine at the outlet of the anolyte compartment of the cell was 31%.

EXAMPLE 24

The conditions of example 22 have been used except that the anolyte compartment has been fed with an aqueous composition comprising per kg of composition, 250 g of sodium chloride, and per liter of composition 70 mg of acetic acid, 25 mg of formic acid, 10 mg of oxalic acid and 5 mg of dichloroacetic acid, and a TOC of 65 mg of C/l.

The aqueous solution was a reaction medium obtained after the treatment of step (a) according to the first embodiment of the invention. The solution has been submitted to typical dechlorination, NaCl saturation and ion-exchange resin treatments before being fed to the cell.

The TOC value in the brine at the outlet of the anolyte compartment of the cell was 24 mg of C/l.

The TOC conversion in the brine at the outlet of the anolyte compartment of the cell was 68%.

EXAMPLE 25

The procedure of example 8 has been followed.

The brine engaged in the treatment contained per kg, 0.69 g of glycerol, 0.59 g of 1-chloro-2,3-propanediol, 0.08 g of 2-chloro-1,3-propanediol, 0.39 g of epichlorohydrin, 0.08 g of hydroxyacetone, 0.073 g of acetic acid, 0.050 g of formic acid, 0.018 g of lactic acid, 0.012 g of propionic acid and 16.53 g of sodium chloride. The sodium chloride content of the brine was 176 g/l and the balance was water. The measured TOC of that brine was 1.4 g C/l and the measured COD was 3.9 g O/l.

The hypochlorite solution contained per kg, 1.39 mol of sodium hypochlorite (NaOCl, 98.7 g $Cl_2$/kg)), 0.010 mol of sodium chlorate ($NaClO_3$), 0.55 mol of sodium hydroxide, 1.45 mol of sodium chloride, the balance being demineralized water.

The pH of the reaction medium in the first two reactors has been regulated by addition of a 6% hydrogen chloride aqueous solution.

A brine with a TOC value of 0.085 g C/l has been recovered at the output of the third reactor. That brine contained per kg, 2.65 mol of NaCl, 0.016 mol of sodium hypochlorite, 0.033 mol of sodium chlorate, 0.12 g of acetic acid, 0.012 g of propionic acid, 0.008 g of formic acid, 0.005 g of lactic acid, 0.006 g of succinic acid and 0.003 g of adipic acid. The pH of the brine was 7.1.

The brine has been acidified to pH 1.6 by addition of concentrated hydrochloric acid and chlorine was stripped by flushing nitrogen. After that, pellets of caustic soda have been added to set the pH of the brine at 7.6.

A sample of 505.8 g of that brine has been submitted to evaporative crystallization treatment by heating to boil at normal pressure in a 1 liter glass flask equipped with a polytetrafluoroethylene coated magnetic rod, with a thermocouple sensor in a glass jacket and with a head of distillation connected to a condenser cooled with water at 25° C.

257.7 g of a first water evaporate have been collected and a first residue of evaporation has been obtained. A first fraction of crystallized sodium chloride has been recovered by filtration of the first residue of evaporation and washed with 18 g of demineralized water. The first wet salt recovered after washing weighted 21.9 g. The first filtrate weighted 217.1 g.

195.1 g of the first filtrate have been submitted to evaporation in the same equipment.

106.1 g of a second water evaporate have been collected and a second residue of evaporation has been obtained.

A second fraction of crystallized sodium chloride has been recovered by filtration of the second residue of evaporation and washed with 25 g of demineralized water. The second wet salt recovered after washing weighted 41.33 g. The second filtrate weighted 32.46 g.

The TOC values have been determined for all the distillates and filtrates as such and for the wet sodium chloride fractions after dissolution of the salt in water so as to obtain a 20% by weight of salt solution. The results are summarized in the Table 9.

EXAMPLE 26

The brine used in the example 25 has been submitted to the evaporative crystallization treatment of example 25 directly i.e. without applying the hypochlorite treatment.

A sample of 508.7 g of that brine has been submitted to evaporative crystallization treatment by heating to boil at normal pressure in a 1 liter glass flask equipped with a polytetrafluoroethylene coated magnetic rod, with a thermocouple sensor in a glass jacket and with a head of distillation connected to a condenser cooled with water at 25° C.

249 g of a first water evaporate have been collected and a first residue of evaporation has been obtained. A first fraction of crystallized sodium chloride has been recovered by filtration of the first residue of evaporation and washed with 12.2 g of demineralized water. The first wet salt recovered after washing weighted 15.95 g. The first filtrate weighted 250.1 g.

208.8 g of the first filtrate have been submitted to evaporation in the same equipment.

102.7 g of a second water evaporate have been collected and a second residue of evaporation has been obtained.

A second fraction of crystallized sodium chloride has been recovered by filtration of the second residue of evaporation and washed with 11.5 g of demineralized water. The second wet salt recovered after washing weighted 47.23 g. The second filtrate weighted 50.6 g.

The TOC values have been determined for all the distillates and filtrates as such and for the wet sodium chloride fractions after dissolution of the salt in water so as to obtain a 20% by weight of salt solution. The results are summarized in Table 9.

TABLE 9

| Example | First Filtrate (mgC/l) | Second Filtrate (mgC/l) | First Distillate (mgC/l) | Second Distillate (mgC/l) | First Wet Salt (mgC/l) | Second Wet Salt (mgC/l) |
|---|---|---|---|---|---|---|
| 25 | 181 | 685 | 1.6 | 1.9 | 3 | 4 |
| 26 | 2900 | 8000 | 85 | 110 | 15 | 220 |

The invention claimed is:

1. A process for degrading an organic substance in an aqueous composition, said method comprising:
   (a) reacting, in a liquid reaction medium, said aqueous composition with at least one composition comprising hydroxide ions ($OH^-$) and hypochlorite in a molar ratio between hydroxide and hypochlorite higher than or equal to 0.001 and lower than 1.5, in order to oxidize said organic substance,
   wherein said reacting is carried out at a first pH value controlled and maintained at a value of 6-9.

2. The process according to claim 1 wherein the reaction of in (a) is carried out in at least one of the following conditions:
   i. a pH controlled and maintained in a range which lowest limit is higher than or equal to 7 and which highest limit is lower than or equal to 9,
   ii. a temperature higher than or equal to 10° C. and lower than or equal to 200° C.,
   iii. a pressure higher than or equal to 1 bar (absolute) and lower than or equal to 11 bar,
   iv. when (a) of the process is carried out in a discontinuous mode, a duration higher than or equal to 0.05 h and lower than or equal to 8 h,
   v. when (a) of the process is carried out in a continuous mode, a residence time higher than or equal to 0.05 h and lower than or equal to 8 h.

3. The process according to claim 1 wherein (a) is carried out in a continuous mode, and wherein the reaction of (a) is carried out in at least two consecutive reaction zones, at least one of which is operated under mixed regime and at least one other of which is operated under plug flow regime.

4. The process according to claim 1 wherein the aqueous composition originates from a process for manufacturing an epoxide, or from a process for manufacturing a chlorinated organic compound, or from both processes.

5. The process according to claim 1, comprising reacting, in a liquid reaction medium, said aqueous composition with at least one composition comprising hydroxide ions ($OH^-$) and hypochlorite in a molar ratio between hydroxide and hypochlorite higher than or equal to 0.05 and lower than 1.2, in order to oxidize said organic substance.

6. The process according to claim 1, comprising reacting, in a liquid reaction medium, said aqueous composition with at least one composition comprising hydroxide ions ($OH^-$) and hypochlorite in a molar ratio between hydroxide and hypochlorite higher than or equal to 0.75 and lower than 1.0, in order to oxidize said organic substance.

7. The process according to claim 1 wherein the aqueous composition comprises at least one salt, and wherein said method further comprises (b1) subjecting at least part of the reaction medium of (a) to an operation selected from the group consisting of cooling, evaporative crystallization, and any combination thereof, in order to precipitate at least part of the salt, followed by recovering at least part of the precipitated salt and at least part of the water present in the aqueous composition.

8. The process according to claim 7, further comprising (b2) subjecting at least part of the reaction medium of (a) to an acidification operation in order to bring the pH to a second value lower than said first pH value and further oxidizing the organic substance.

9. The process according to claim 8, wherein (b1) is carried out on the reaction medium obtained at the end of (b2).

10. The process according to claim 8 wherein at least one of (a), (b1) and (b2) is carried out in a continuous mode.

11. The process according to claim 8, comprising reacting, in a liquid reaction medium, said aqueous composition with at least one composition comprising hydroxide ions ($OH^-$) and hypochlorite in a molar ratio between hydroxide and hypochlorite higher than or equal to 0.05 and lower than 1.2, in order to oxidize said organic substance.

12. The process according to claim 8, comprising reacting, in a liquid reaction medium, said aqueous composition with at least one composition comprising hydroxide ions ($OH^-$) and hypochlorite in a molar ratio between hydroxide and hypochlorite higher than or equal to 0.75 and lower than 1.0, in order to oxidize said organic substance.

13. The process according to claim 1, further comprising (b2) subjecting at least part of the reaction medium of (a) to an acidification operation in order to bring the pH to a second value lower than said first pH value and further oxidizing the organic substance.

14. The process according to claim 13, wherein at least one compound selected from the group consisting of chlorine, hypochlorite, chlorate, chlorine dioxide, dichlorine monoxide, and any mixture thereof, is added to the reaction medium of (b2).

15. The process according to claim 14, wherein the compound is chlorine and the partial pressure of chlorine during (b2) is higher than or equal to 0.001 bar and lower than or equal to 10 bar.

16. The process according to claim 13, wherein during or after (b2) a treatment with UV-visible light is carried out on the reaction medium.

17. The process according to claim 16, wherein the UV-visible light has a wavelength higher than or equal to 100 nm and lower than or equal to 400 nm, wherein the UV-visible light is emitted by a source and wherein a ratio between the electrical energy consumed by the source in watt-hour Wh and the volume of the treated part of the reaction medium of (a) in liters is 1-100 Wh/liter.

18. The process according to claim 13, wherein during or after (b2) a treatment by electrolysis is carried out on the reaction medium.

19. The process according to claim 18, wherein the treatment by electrolysis is carried out in an anodic compartment of a divided electrolysis cell, wherein the anodic current density is higher than or equal to 1 A/m2 of anode and lower than or equal to 25000 $A/m^2$ of anode and wherein the ratio between the surface of the anode and the volume of the part of the treated reaction medium from step (a) is higher than or equal to 0.001 $cm^{-1}$ and lower than or equal to 1 $cm^{-1}$.

20. The process according to claim 13 wherein (b2) is carried out in at least one of the following conditions:
   i. a pH controlled and maintained in a range which lowest limit is higher than or equal to 0.01 and which highest limit is lower than 6, ii. a temperature higher than or equal to 10° C. and lower than or equal to 200° C., a pressure higher than or equal to 1 bar (absolute) and lower than or equal to 11 bar,
iii. when (b2) of the process is carried out in a discontinuous mode, a duration higher than or equal to 0.05 h and lower than or equal to 8 h,
iv. when (b2) of the process is carried out in a continuous mode, a residence time higher than or equal to 0.05 h and lower than or equal to 8 h.

* * * * *

UNITED STATES PATENT AND TRADEMARK OFFICE
CERTIFICATE OF CORRECTION

PATENT NO. : 8,795,536 B2  
APPLICATION NO. : 12/864211  
DATED : August 5, 2014  
INVENTOR(S) : Patrick Gilbeau et al.

Page 1 of 1

It is certified that error appears in the above-identified patent and that said Letters Patent is hereby corrected as shown below:

In the Claims

Column 29, line 29, claim 2, should read --2. The process according to claim 1 wherein the reaction--

Column 29, line 34, claim 2, "10° C." should read --10° C--

Column 29, line 35, claim 2, "200° C." should read --200° C--

Column 31, line 1, claim 20, "10° C." should read --10° C--

Column 31, line 2, claim 20, "200° C." should read --200° C--

Signed and Sealed this  
Twenty-seventh Day of January, 2015

Michelle K. Lee  
*Deputy Director of the United States Patent and Trademark Office*